United States Patent
Lev-Ran et al.

(10) Patent No.: US 7,612,796 B2
(45) Date of Patent: *Nov. 3, 2009

(54) VIDEO-BASED SYSTEM AND METHOD FOR COUNTING PERSONS TRAVERSING AREAS BEING MONITORED

(75) Inventors: Ilan Lev-Ran, Davie, FL (US); Dov Topaz, Hofhacarmel (IL)

(73) Assignee: Countwise, LLC, Davie, FL (US)

( * ) Notice: Subject to any disclaimer, the term of this patent is extended or adjusted under 35 U.S.C. 154(b) by 918 days.

This patent is subject to a terminal disclaimer.

(21) Appl. No.: 10/745,630

(22) Filed: Dec. 29, 2003

(65) Prior Publication Data

US 2004/0145658 A1    Jul. 29, 2004

Related U.S. Application Data

(63) Continuation-in-part of application No. 09/481,447, filed on Jan. 13, 2000, now Pat. No. 6,697,104.

(51) Int. Cl.
*H04N 7/18* (2006.01)
*H04N 9/47* (2006.01)

(52) U.S. Cl. .................................... 348/143; 382/118

(58) Field of Classification Search .................. 348/143, 348/156, 153, 171, 172, 142, 149, 150, 155, 348/218, 169, 170; 382/155, 65, 118, 115

See application file for complete search history.

(56) References Cited

U.S. PATENT DOCUMENTS

| | | | |
|---|---|---|---|
| 5,153,719 A * | 10/1992 | Ibenthal | 348/699 |
| 5,305,390 A | 4/1994 | Frey | |
| 5,339,275 A | 8/1994 | Hyatt | |
| 5,465,115 A * | 11/1995 | Conrad et al. | 348/155 |
| 5,866,887 A | 2/1999 | Hashimoto | |
| 5,973,732 A * | 10/1999 | Guthrie | 348/169 |
| 6,166,729 A | 12/2000 | Acosta | |
| 6,307,951 B1 * | 10/2001 | Tanigawa et al. | 382/103 |

(Continued)

FOREIGN PATENT DOCUMENTS

WO    WO 98/08208    2/1998

(Continued)

*Primary Examiner*—Behrooz Senfi
(74) *Attorney, Agent, or Firm*—Heslin Rothenberg Farley & Mesiti P.C.

(57) ABSTRACT

A video based system and method for detecting and counting persons traversing at least two areas being monitored. The method includes the steps of initialization of at least one end unit, having at least a camera, the camera producing images of at least a first area being monitored and a second area being monitored, digitizing the images and storing the digitized images in a non-volatile memory unit and a working memory unit; detecting potential persons in the images; comparing the digitized images of objects detected in the first area and second area being monitored with digitized images stored in the working memory unit to determine whether the detected object is a new figure in such area or whether the detected object is a known figure that has remained within such area and to determine that a figure which was not detected has left such area; incrementing a counter for such area with an indication of the number of persons that have passed through such area, and comparing the number of persons passing through a first area with the number of persons passing through a second area.

29 Claims, 13 Drawing Sheets

U.S. PATENT DOCUMENTS 6,374,296 B1 * 4/2002 Lim et al. .................... 709/225
6,456,320 B2 * 9/2002 Kuwano et al. ............. 348/143
6,549,650 B1 * 4/2003 Ishikawa et al. ............ 382/154
6,697,104 B1 * 2/2004 Yakobi et al. ............... 348/143

FOREIGN PATENT DOCUMENTS

WO          WO 99/04378          10/1999

* cited by examiner

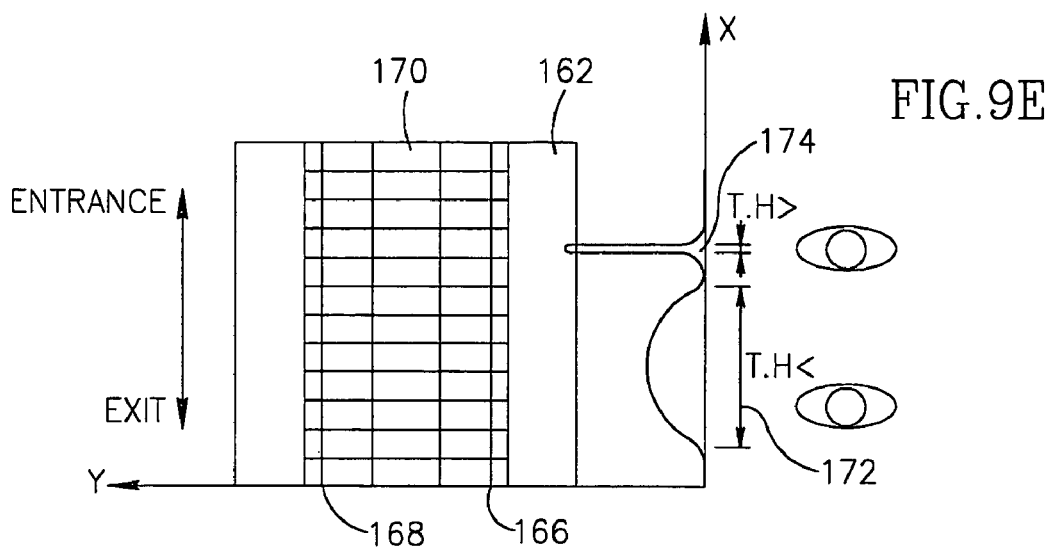
FIG.9E
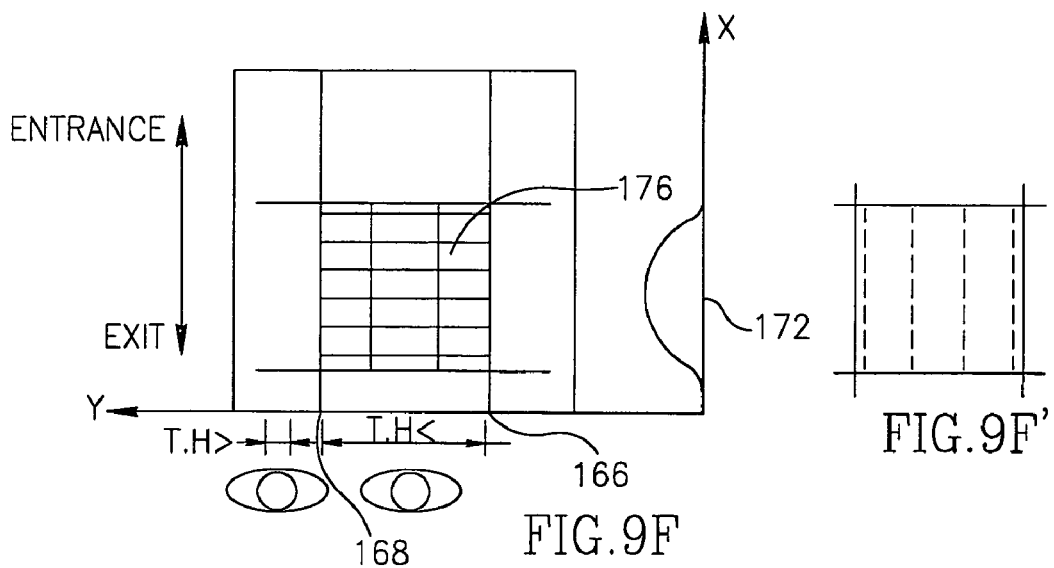
FIG.9F
FIG.9F'
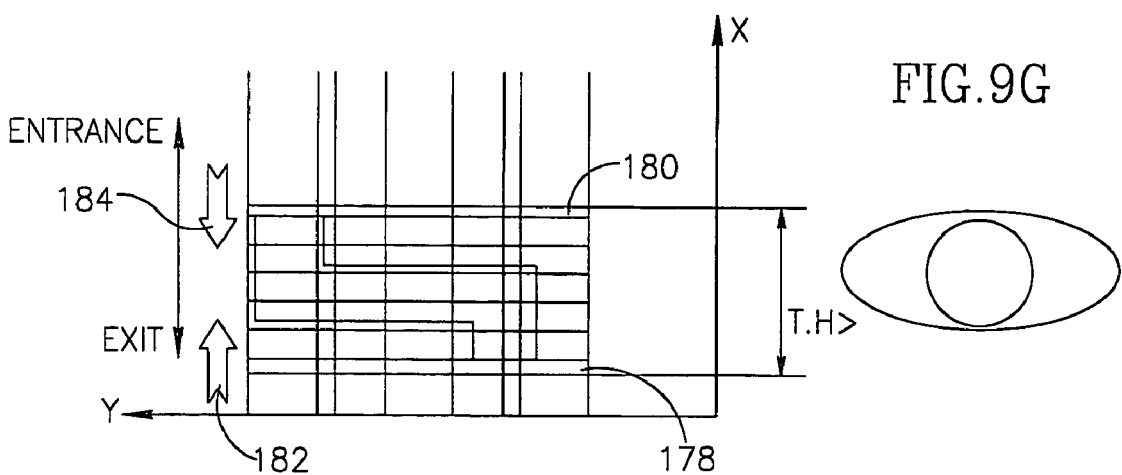
FIG.9G

VIDEO-BASED SYSTEM AND METHOD FOR COUNTING PERSONS TRAVERSING AREAS BEING MONITORED

CROSS REFERENCE TO RELATED APPLICATIONS

The present application is a continuation in part of prior patent application Ser. No. 09/481,447 filed on Jan. 13, 2000 now U.S. Pat. No. 6,697,104 entitled "A Video-Based System and Method For Detecting and Counting Persons Traversing an Area Being Monitored", and incorporated herein by reference in its entirety.

FIELD OF THE INVENTION

The invention relates generally to video image processing and more particularly to an apparatus, system and method for obtaining and processing information about the quantity and the direction of movement of people in crowded areas using video image processing.

BACKGROUND OF THE INVENTION

Monitoring the movement of people entering and leaving major public areas, such as malls, shopping areas, chain-stores, casinos, airports, bus and train stations and sport facilities provides significant and valuable information to the management of these areas.

For example, information regarding the number of entrances and exits of people to and from a particular doorway of a specific store or the number of people passing by or crossing in front of a specific store, public area or other area of interest within a period of time, enables the management to evaluate the store's efficiency, and obtain a correlation between the number of visitors and sales. Furthermore, it is possible by checking the number of visitors against employees, to check the employee/customer ratio to determine whether the staff are overloaded and analyze the customer service being obtained vis-a-vis sales. Likewise, by checking a ratio of the number of people passing by or crossing in front a store, public area or other area of interest against the number of people entering such area it may be possible to determine of the appeal of the area's location, set-up, decor, etc.

During the last few years, video image processing systems and visual image processing systems have been developed in order to provide information about the movement of people. Methods and apparatus using video based systems for obtaining information about the movement of people are known. For example, WO Application No: 98/08208, assigned to Footfall Ltd., entitled "Video Imaging Systems", describes video image sampling at a low resolution and with a homogenous scattering of sample points, The low resolution and sampling scattering saves computer resources. However, since the samples are taken at low resolution with a homogenous scattering of the sample points, the correlation level between one sample and another of the same area is low and there is a danger of losing positive identification of figures due to the low resolution. This system, which uses the resources of a personal computer (PC), is not capable of performing a high-resolution process of the images, which are constantly being received from several end units.

WO Application No: 99/04378, assigned to Footfall Ltd., entitled "Video Imaging Systems", describes an improvement of the earlier application (WO 98/08208), described hereinabove, utilizing infra red (IR) light to illuminate the moving figures and recording the image with an IR sensitive video camera. The IR camera and illumination solves the problem of shadowing of their previous patent which is critical in case of low resolution of the video image. Low resolution sampling to distinguish the moving figures from the background and identify them as people is sensitive to shadowing.

However, the addition of IR light resources and IR sensitive video means involve extra costs, making the system more cumbersome and requiring wiring and suitable power sources wherever the units are installed. Usually, these installations are installed in the ceiling, which may, for example, be concrete, thus requiring specialized suspension devices.

U.S. Pat. No. 5,973,732 to Guthrie, entitled "Object Tracking System For Monitoring a Controlled Space", describes video image processing which initially uses low resolution of "super pixels", that is "cells" or "blocks" of pixels, instead of processing at single pixel level. This is done in order to reduce the analysis necessary in order to identify and preliminarily locate the moving figures within the area of interest. However, by decreasing the sampling resolution to fixed "cells" or "blocks" as mentioned, the system knowingly suffers from an information loss. Thus, since the processing is made according to a net of "cells" or "blocks" having a fixed size, there is a danger that an object, which passes on the borders of two "blocks", cannot be distinguished from the fixed background, and could not be identified as a figure.

U.S. Pat. No. 5,465,115 assigned to RCT Systems Inc., entitled "Video Traffic Monitor for Retail Establishments and the like", describes a video detection process of passing figures as such by positioning an imaginary strip of "gates" or in other words a line of imaginary static "turnstiles" on the video image and identifies the object as a figure when it fills the "gate" or passes through the "turnstile.

The system does not actively search for and track figures over the whole videoed area, but identifies the entry and exit of a figure into and from an imaginary strip of "gates", in order to reduce computer resources. This system is inflexible—entry and exit of static to and from the strip could be considered as figures filling (or emptying) the gates and therefore the system requires re-initialization.

Furthermore, the prior art systems do not integrate data collection into an overall system for client commercial purposes. For example a potential client of a system of this kind could be a manager of an international chain of stores or other public areas or areas of interest who needs a daily report regarding the number of people entering, exiting or passing by or crossing in front of such areas. Modern communication systems which enable information to be gathered and transmitted by telephone, modem, cellular communication and Internet, for example, are well known in the art. However, prior art video imaging systems, and visual imaging systems which supply information about the movement of people, do not deal with the combination of such systems with on-line communication systems.

SUMMARY OF THE INVENTION

Therefore, in view of the limitations of systems based on the prior art, there is need of a video-based system and method for obtaining information about people, whose end unit is integral, easily installable and standalone, to the greatest possible extent, in terms of integral independent capabilities for picture processing and data accumulation therein. Limitations on processing resources will not make it necessary to forgo reliability, and it will be possible to integrate the end units in modern communications systems (e.g.—cellular communications, the Internet and combinations of the two), such that data can be transferred to the customer easily, without his having to invest in additional communications and data processing systems.

One object of the present invention is to enable easy and convenient installation of one or more end units in a ceiling of any type (ordinary or acoustic). The structure of an end unit according to the invention is adapted for installation in a variety of ceilings, and no other infrastructure is required beyond the electricity supply. An end unit according to the invention is thus adapted to the level of a field technician, who will not have to do complicated assembly work or deal with auxiliary installations in the event that the ceiling is of a different type than what he expected.

A further object of the invention is operational independence. The invention does not require dedicated lighting means extrinsic to the end unit, or infrared photography. An end unit according to the invention relies in its operation on the ordinary lighting which is present in any case in the photographed area, and adjusts itself to this lighting. The problem of shadows and changes that occur in the lighting conditions is solved in the end unit without need of additional, dedicated lighting means.

A further object of the invention is to enable immediate processing, which is performed in a standalone processor integrally installed in the end unit itself. The end unit processes the video image produced by an internal camera installed in the end unit, and even enables parallel reception and processing of two video images arriving simultaneously from internal cameras installed in a single end unit or in two separate end units. The standalone processor installed in the end unit itself enables independence from distant external processing units, and the ability of a processor in one end unit to process two images simultaneously makes it possible to increase the area in respect of which the data processing is requested or to capture information about two areas such as for example the number of people entering and exiting a store, public area or area of interest and the number of people passing by a doorway or entry of such area. Similarly, a first camera in an end unit may cover an entryway/egress path of an area of interest, and a second camera in such same or another end unit may cover an area for example perpendicular to such entry, where passers-by walk past or cross in front of the area. A comparison may then be made between the number of persons passing through a first area being monitored, such as an entryway, and the number of people passing through a second area being monitored such as a passer-by walkway.

A further object of the invention is to enable processing as stated, while choosing specific areas of interest out of the general view seen in the video picture, with the possibility for selection and immediate adjustment of the size and position of the areas. An end unit according to the invention enables the technician installing it to initialize the unit for areas out of the general view in the photographed picture, such that the data processing and production are performed only on specific areas designated in the view as areas of interest (e.g.—elevator openings, staircase, where there is human traffic), and not on areas of no interest (e.g.—static display cabinets).

A further object of the invention is to enable processing as stated at a high resolution, in the critical initial stage of differentiating objects from the photographed background, and identification of the objects as images passing through the areas of interest in the photographed area. The invention does not "sacrifice" information that could represent images, and performs a preliminary identification at a high level, while reducing the likelihood of information loss and error.

A further object of the invention is to enable accumulation of data from the information processed in the end unit, i.e.—the quantities of people and the directions of their movement—in an integral memory installed in the end unit itself, and retrieval of the data from the memory and the transfer thereof from time to time over distances, based on a command sent from a distance. An end unit according to the invention does not rely on external memory components.

A yet further object of the invention is the transfer of data that is retrieved from a distance from the end unit, in a secured manner, via a variety of communication media.

In another preferred configuration of the invention—the sending of data is done by cellular communications such as for example GSM (in addition to or as a substitute for other communications media, such as—cables, RF transmission, telephone line).

A further object of the invention, in another preferred configuration thereof, is to enable the concentration of the retrieved data in a central site on the Web, allowing access to the data only to authorized customers (customer access is limited to data in respect of which the authorization was granted). The central site is able to provide data analysis and processing services for commercial purposes, thereby saving on the costs entailed in the development of independent computerization and data processing capabilities.

In other words, the invention offers a service to subscription customers—a data "bank" of sorts whose customers, by "surfing" on the Web to the central site, are able to enter the secured "vault room" and obtain their information—to receive reports and processed statistical presentations based on people entry, departure and passerby data as retrieved from the end units according to the invention that were installed in the ceilings of—for example—stores, casinos or other areas of interest under their ownership distributed around the world.

There is thus provided, in accordance with an embodiment of the invention, a method for detecting and counting persons traversing areas being monitored. The method includes the steps of:

initialization of at least an end unit forming part of a video imaging system, the end unit having at least a camera installed therein capturing images of a first area being monitored and a second area being monitored, the camera producing images within the field of view of the camera of at least part of the areas or routes being monitored, the end unit includes at least a non-volatile memory unit and a working memory unit, the non-volatile data memory unit includes a plurality of counters;

digitizing the images and storing the digitized images in at least one of the non-volatile memory units and a working memory unit;

detecting objects being potential persons from the digitized images;

comparing the digitized images of objects detected in areas being monitored with digitized images stored in the working memory unit to determine whether the detected object is a new figure that has entered an area being monitored or whether the detected object is a known figure, that has remained within an area being monitored and to determine that a figure which was not detected has left the area being monitored;

incrementing at least one of the plurality of counters with an indication of the number of persons that have passed through an area being monitored; and comparing an indication of the number of people that passed through a first area being monitored with an indication of the number of people that have passed through a second area being monitored.

Furthermore, in accordance with a preferred embodiment of the invention, the step of incrementing further includes at least one of the steps of:

incrementing one of the plurality of counters with an indication of the number of persons that have passed through an area being monitored and have left the area being monitored in a pre-determined direction; and incrementing one of the plurality of counters with an indication of the number of persons that have passed through an area being monitored and have left an area in one of at least two directions.

There is also provided, in accordance with a preferred embodiment of the invention, a video based system for detecting and counting persons traversing areas being monitored. The system includes at least one end unit with at least two cameras or with one camera capable of capturing images of two areas being monitored, a device for remote retrieval of the data stored in the non-volatile memory unit, a device for processing the data and generating reports therefrom and comparing a number of persons traversing said first area with a number of persons traversing a second area, and a device for displaying the reports.

The end unit includes at least two CCD cameras or a single camera capable of capturing images of two areas being monitored, an A/D converter for converting analog information from the cameras to digital information, a digital switching unit connected to the A/D converter, a video processor connected to the digital switching unit, for receiving the digital video information from the digital switching unit; and a non-volatile memory unit and a program working memory unit that may be coupled through an address and data bus to the video processor.

BRIEF DESCRIPTION OF THE DRAWINGS

The present invention will be understood and appreciated more fully from the following detailed description taken in conjunction with the appended drawings in which:

FIG. 9 is a flow chart illustration of the basic detection steps;

FIGS. 9A-9G, which are illustrative examples of the detection of FIG. 9;

FIG. 10 is a flow chart illustration of the matching stage of the flow chart of FIG. 9;

DETAILED DESCRIPTION OF THE PRESENT INVENTION

Figure 1:
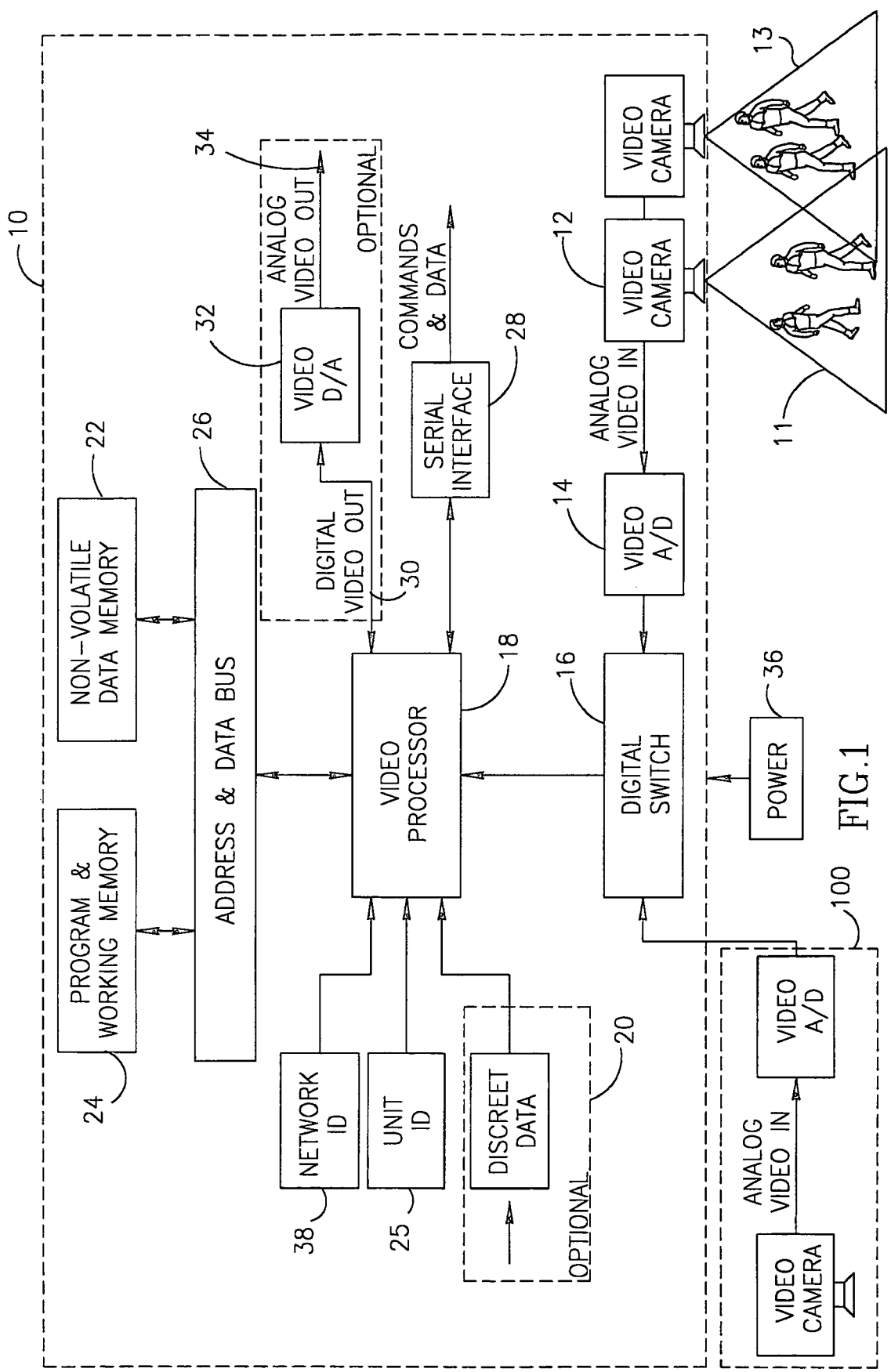
FIG. 1 is a schematic block diagram illustration of a stand alone end unit and processing apparatus, constructed and operative in accordance with a preferred embodiment of the present invention.

Reference is now made to FIG. 1, which is a schematic block diagram illustration of a stand alone end unit, generally designated 10, constructed and operative in accordance with a preferred embodiment of the present invention.

In accordance with an embodiment of the invention, the stand alone end unit 10 comprises two CCD type video cameras 12' and 12" and an A/D converter 14 for converting the analog information from the cameras to digital information. A digital switching unit 16, connects the A/D converter 14 to a video processor 18, for transferring the digital video information to the video processor 18. In some embodiments, cameras 12' and 12" may be positioned for example perpendicular or at other angles to each other within end unit 10 such that one such camera 12' may capture images of for example an entryway/egress route 11 into for example a store or other space, and a second camera 12" may capture images of a passerby route 13 that may be for example in front of such a store or space or that may intersect with the entryway/egress route 11 from such store, public space or other area of interest. In some embodiments, two end units 10 may be used where each end unit contains a single camera 12, such that one end unit 10 covers entryway/egress route 11 and additional end unit 100 covers passerby route 13. In some embodiments a single camera 12 capable of capturing images of both an entryway/egress route 11 and a passerby route 13 may be included in one end unit 10.

The video processor 18 that may be assembled in the end unit 10 may be a dedicated video processor of the type that enables real-time processing of a video image, such as the "Trimedia" model, manufactured by the Philips Corporation.

As an option, the end unit 10 may receive and process in parallel additional digital video information, which comes from for example additional end unit 100. This additional information, from additional end unit 100, may be passed through the digital switch 16 which switches between the video information from the end unit 10 from the camera converter 14 and the information from additional end unit 100.

The video processor 18 may be provided with a unique identification number 25 at the factory level, and the field technician may add an additional identification number as needed for the operation of the unit as part of a system utilizing, for example, RS485 communication.

As an option, the video processor 18 may receive in addition to the video information, discrete information through a digital IOL 20, such as a car counting sensor in a parking lot, or a sensor for lowering and raising a gate, for example.

A non-volatile data memory unit 22 and a program and working memory 24 may be connected through an address and data bus 26 to the video processor 18. In some embodiments, a non-volatile data memory unit 22 and a program working memory 24 may be included in an end unit 10 for each camera 12 in such end unit 10. In some embodiments two or more cameras 12 may share a single non-volatile data memory unit 22 and a program working memory 24. In still other embodiments a non-volatile data memory unit 22 and a program working memory 24 may be divided to accommodate data or images transferred from more than one camera 12.

A serial interface 28 may be in communication with the video processor 18 in order to receive and send commands and data to and from the video processor 18. The interface 28 may be any suitable communication interface, such as for example a GSM cellular communication interface, or linear communication interface or combination of both.

As an option, the video processor 18 may in some embodiments additionally send video information as well as data, through a video output 30, which sends it to a digital to analog (D/A) converter 32 and then, to an analog video output 34.

The end unit 10 may receive its external electric power 36 via a voltage input or power supply.

The components (referred to above) of the preferred embodiment of the end unit 10, are well known in the field, and are thus only briefly described.

Operation of the End Unit:

The end unit 10 may be installed (over for example an entryway/egress route 11 or a passerby route 13 in front of an entrance) and connected to for example an electrical power source 36 or a battery. Through the serial interface 28, the network ID 38 (if it is a unit that operates as part of a network) may be initiated and the specific areas of interest 25 may be set, for example, to the space in front of an entrance and not an exhibition cabinet). A picture of the area is video taped with a video camera 12, installed in the end unit 10, and converted by the A/D converter 14 into digital information. The picture of the area, as digital information, may then transferred to a video processor 18 via the digital switch 16, which simultaneously may switch digital information from a second unit 100 into the video processor 18. The digital video information of a pre-selected area of interest may be processed by the video processor by an algorithm, which will be described later.

Briefly, the processing includes input and output of information from the program and working memory unit 24. Data, including the number of images, their direction of movement (such as "inside"/"outside", or "towards"/"away") and their detection time, are saved in the non-volatile data memory 22. As necessary, a remote command is sent to the end unit 10. The remote command may be identified by the network ID 38 (If it's a network operated system) and by the unit ID 25 which had been imbedded in the end unit 10. The command is transferred through serial interface 28, in order to extract data, which has been stored in the non-volatile data memory 22, and the data is transferred again, through the serial interface 28 and via the communication means that are connected thereto, for example, a telephone line, a cellular communication unit, etc.

As an option, the extracted data may include some discrete data which was stored in the memory 22, such as the accumulative opening and closing of gates. Alternatively, in addition the extracted data may include an analog video picture.

In some embodiments, two or more sets of data may be transferred, such as for example a count of the number of people entering and exiting for example a store, public area or area of interest, and a count of the number of people passing-by or crossing in front of the area. In some embodiments, such data sets may be calculated into a ratio, such as for example the number of entrants into an area of interest per the number of passer-bys of such area of interest. Other ratios may be calculated.

Figure 2:
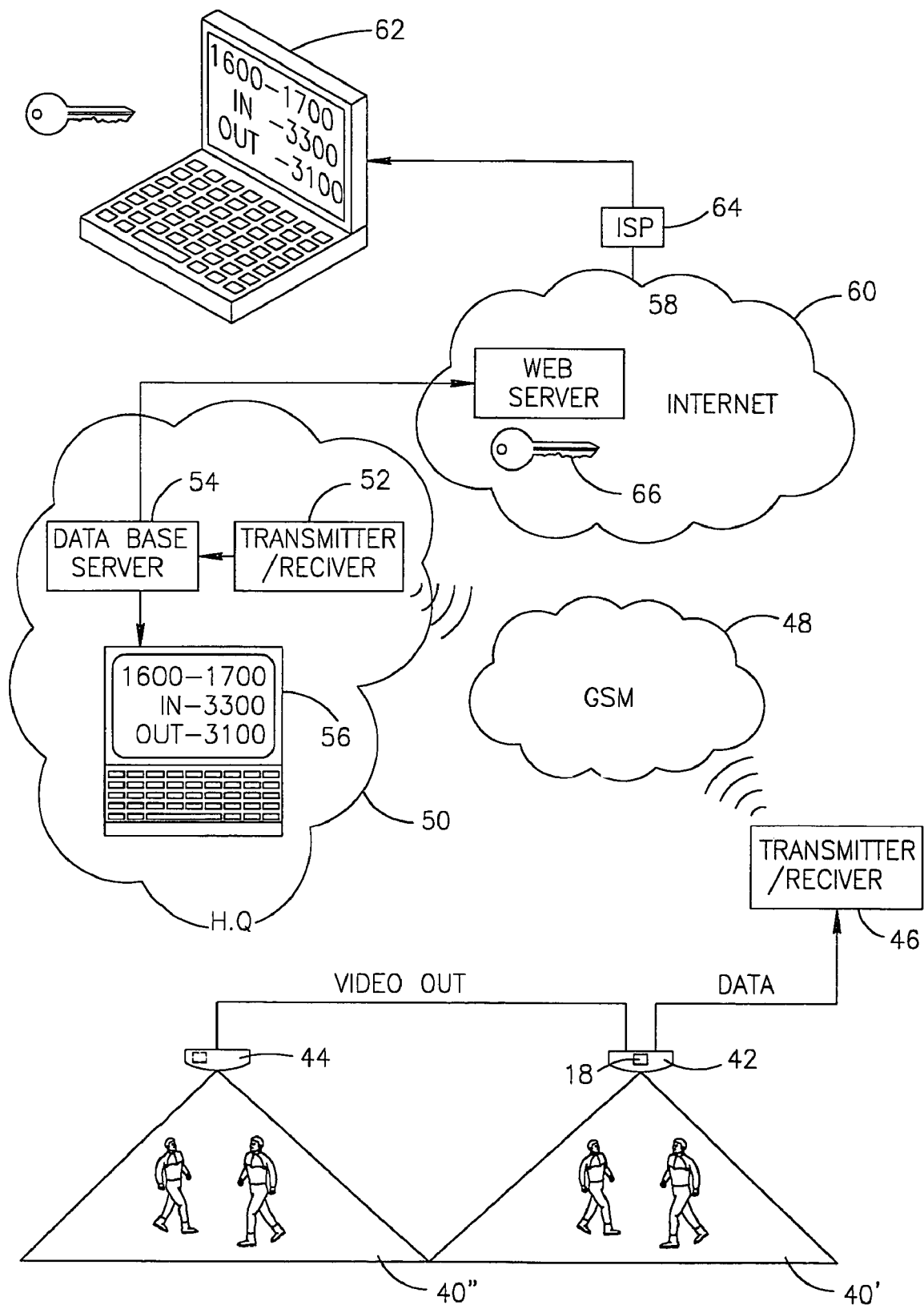
FIG. 2 is a schematic illustration of areas of interest covered by two end units of FIG. 1.

Reference is now made to FIG. 2, which is a schematic illustration of areas of interest, referenced 40' and 40", controlled by two end units, referenced 42 and 44, in accordance with a preferred embodiment of the present invention. FIG. 2 is an example of the method in which the data is transferred to a remote client's computer screen, while utilizing, in this case, a GSM communication system and the Internet.

In the example, illustrated in FIG. 2, two end units 42 and 44 may be installed near each other, for viewing the areas of interest 40' (a store entrance, for example) and 40" (an area for example outside of a store entrance). One unit (say 44) may be a "strapped-down" unit and may not include an active video processor in order to save costs. This unit may be wired to the second unit (42), which includes an active video processor 18, that is capable, as described hereinabove with reference to FIG. 1, to perform parallel processing of the digital video information from two A/D converters from the CCD cameras within the end units 42 and 44. The end unit 42 may be in communication with a transmitter/receiver 46 which is (in this example) operated via the GSM network 48.

In an additional site, referenced 50, which is remote from the site where the end units 42 and 44 are being activated (for example the headquarters of a retail store chain), there may be located a second transmitter/receiver 52 which is in communication with a data base server 54 and a computer 56. The data base server 54 may be connected, in parallel, to a web server 58 in the Internet 60. In a further remote location, (for example, a hotel room where the chain-store manger of the retail store is staying during a business trip), a "laptop" computer, 62 which is installed with an Internet browser, is connected through an Internet Service Provider (ISP) 64 to the Internet 60.

The System Operation:

The digital information obtained from the strapped down unit 44 transfers information of for example area of interest 40' to the adjacent end unit 42, which, in parallel, receives digital information of area of interest 40", that is being viewed by its integral CCD camera.

As has been described with reference to FIG. 1, the digital information from both units 42 and 44 may be switched by a digital switch 16 to the video processor 18 within end unit 42. After a command is received to extract data (the number of "entrances", the number of "exits" and their clock time), the data may be transferred to a GSM operated transmitter/receiver unit 46, which transmits it to another remotely situated receiver/transmitter 52. This data, which is received through the GSM network 48, may be then transferred to a data base server 54, which is connected to a computer 56. Statistical analysis of the data received is carried by computer 56 and report are produced as required. The reports, which are "friendly" user reports, are now positioned at an Internet site that is hosted by web server 58. In order to "surf" the net and view the reports, an encryption key 66 is needed which is only provided to authorized users who have permission to visit the site. Thus, an authorized user can receive, via an Internet connection, the reports wherever he is located in the world. In some embodiments, reports may include data comparing for example the number of entrants counted by for example end unit 42 against the number of passer-bys counted by for example end unit 44.

It will be appreciated that site maintenance and the production of reports can be accomplished by a dedicated commercial entity, which can deal with extraction of data and processing the same for more than one customer. In other words, the site can be use as a "data bank" for several customers, each one having it's own encryption key permitting them access to their own reports and not to any other customer reports.

Thus, by subscribing to a company that extracts data from end units, processes it and posts secured correlated reports on the Internet, the subscribers can save investing in expensive computer resources while keeping themselves updated about the locations and areas of particular interest, no matter where they are located.

Figure 3:
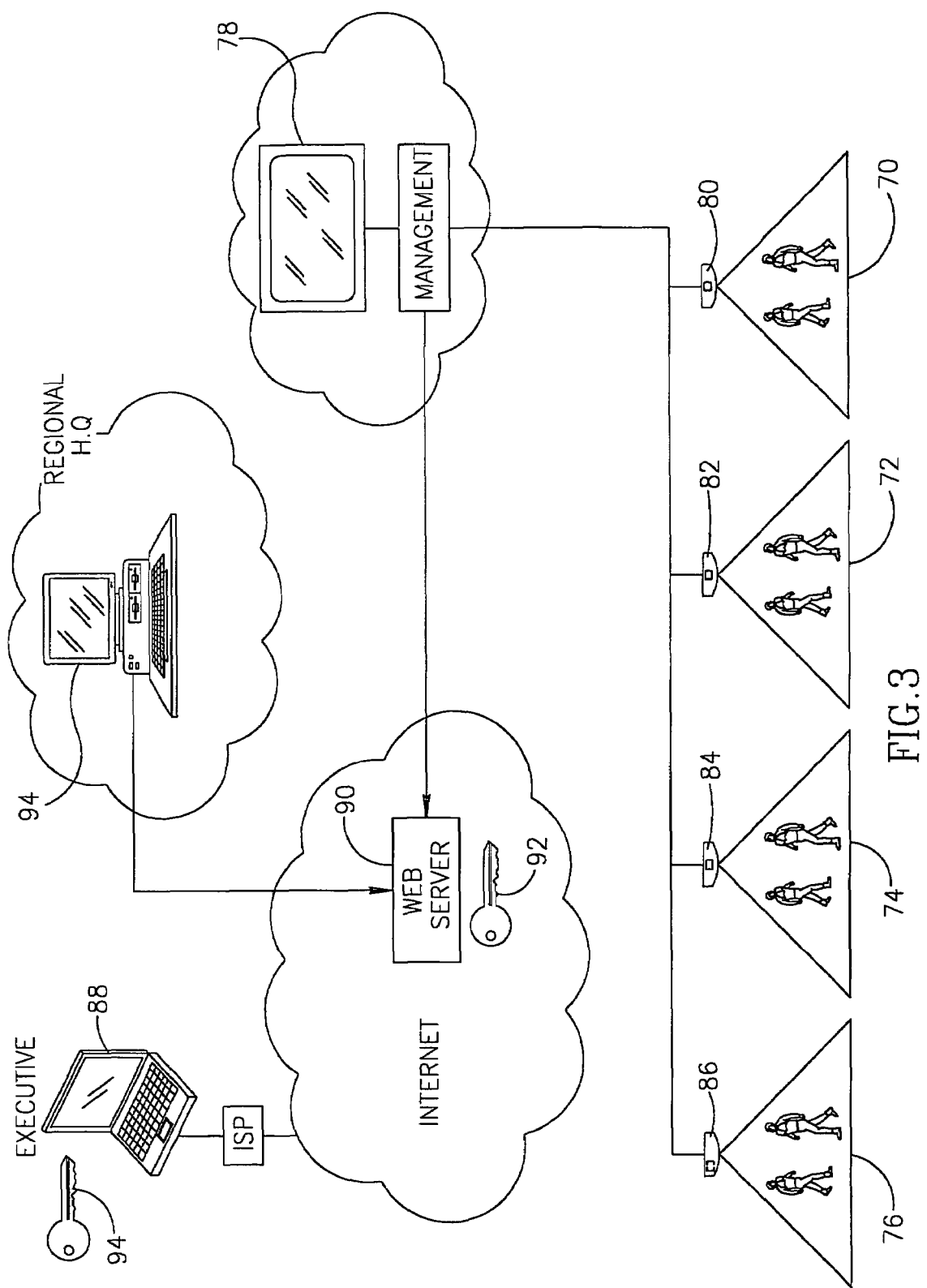
FIG. 3 is a schematic illustration of a plurality of areas of interest, each covered by an end unit of FIG. 1.

Reference is now made to FIG. 3, which is a schematic illustration of a plurality of areas of interest, referenced 70, 72, 74 and 76 which are controlled by end units 80, 82, 84 and 86, respectively, in accordance with a preferred embodiment of the present invention, as an example of the method in which the data is transferred to a client's computer 78 located in close proximity to the areas of interest as well as to a remotely located computer screen 88.

In the illustrated example, four end units 80, 82, 84 and 86 are installed in four sites for viewing the areas of interest 70, 72, 74 and 76 (mall's entrances, for example). In some embodiments one or more of the areas of interests 70 may be for example close to and perpendicular to another area of interest 72, such that one area of interest 70 to count entrants into for example an area of interest, and another area of interest 72 may count passer-bys or people crossing in front of such area of interest. The units may be linearly connected to each other, and the data, extracted from it, may be transferred to a central computer 78, which may be located relatively near to the end units (at the mall's management offices for example). In parallel to the data processing of computer 78, the raw data, as received from the end units 80 and 82 and/or the reports produced based on them, may be securely placed on the web server 90. It may therefore be possible, from another location 94 (such as for example a regional management offices for example) to access the web site, where the data, which contains raw data (such as "entrances" and "exits" information) and reports produced by the local management computer 78 are stored. In addition, access may be restricted to authorized persons having a security encryption "key" 92 to access the web site or a specific portion of it.

In accordance with the above mentioned example, a regional office manager (of a chain of malls), may review the raw data of a specific entrance to for example a specific mall, casino or public area, and also the view the reports produced by the local management computer 78 of the area. In the same manner, the manager of the specific mall or area may view the raw data and reports from a suitable location, using a portable computer 88 installed with a browser, provided he is authorized and holds an encryption key.

It will be appreciated by persons skilled in the art that the embodiments described in FIGS. 2 and 3 are merely examples, and not restricted thereto. For example, any suitable type of communication, data processing, information and display as well as data encryption and security means may be integrated with the end units. It is thus enabling to bring the extracted raw data (the number of "entrances", "exits" or "passer-bys" and their occurrence time), received from the end units 70 and 72, to other locations and to persons authorized to view this data.

Figure 4B:
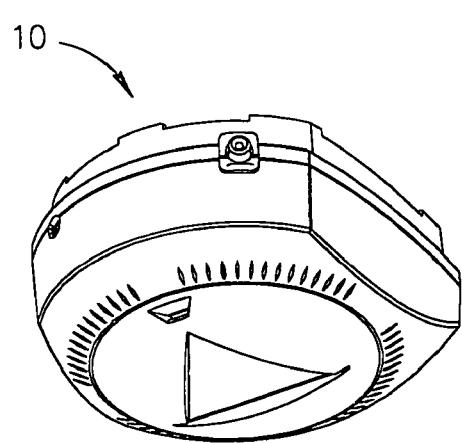
FIGS. 4B and 4C are isometric views of the constructed end unit of FIG. 1.
Figure 4C:
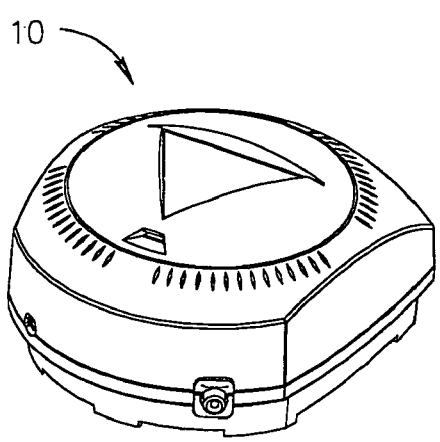
Figure 4A:
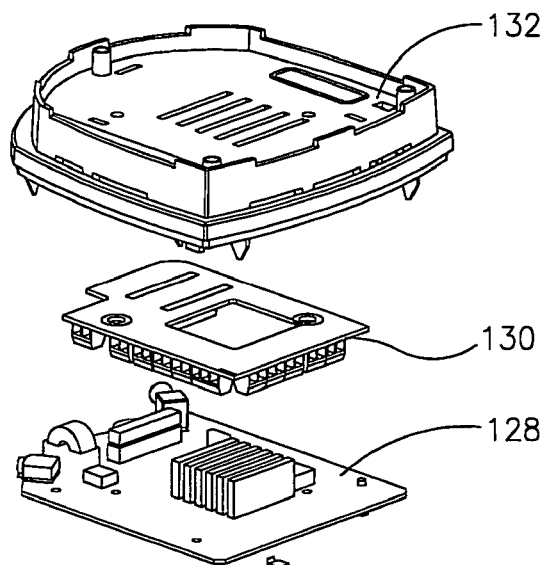
FIG. 4A is an exploded view of the end unit of FIG. 1.
Figure 4A:
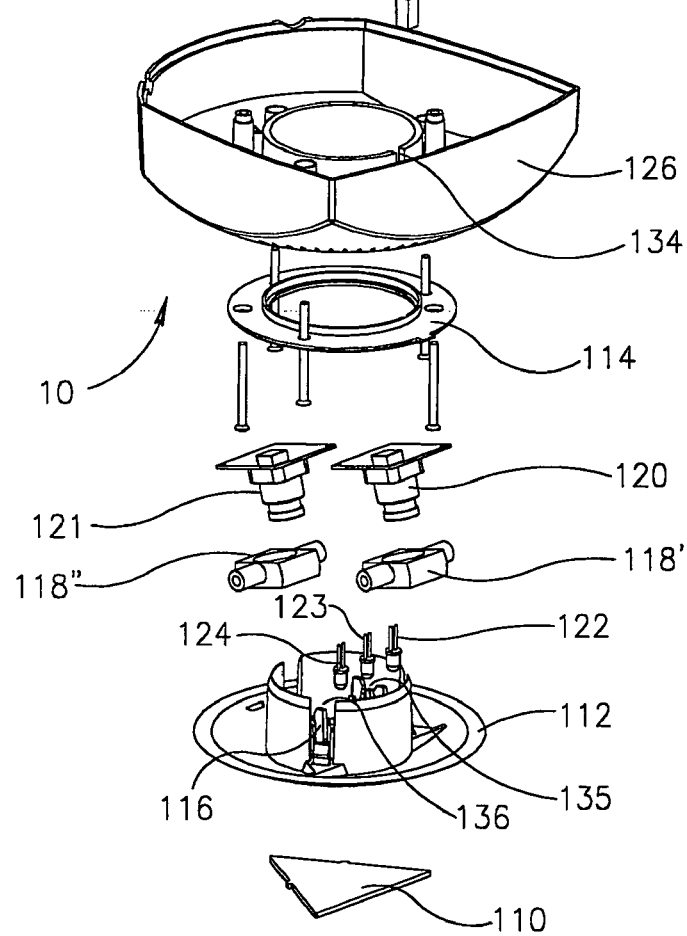

Reference is now made to FIGS. 4A-4C. FIG. 4A is an exploded view of the end unit 10 and FIGS. 4B and 4C are isometric views of the constructed unit 10.

A typical end unit 10, according to the invention, comprises (see FIG. 4A) of a transparent window 110, a domed unit 112, a holding ring 114 with projecting legs 116, for carrying two CCD cameras 120 and 121, three LED lamps 122, 123 and 124, an external housing unit 126, a processor and memory card 128, a connector card 130 and a housing cover 132.

The transparent window 110 is assembled on one side of the domed unit 112. The domed unit 112 is held in place by the holding ring 114 and the projecting legs (which will be explained with reference to FIGS. 6A and 6B).

Cameras 120 and 121 may be installed within adjustable holder 118' and 118" respectively which may be carried by the domed unit 112. In some embodiments, a single camera 120 may be used, such camera being capable of capturing images of two areas to be monitored, such as for example, an entryway/egress route 11 and of a passerby route 13 that may be adjacent to such entryway/egress route.

The domed unit 112 is installed within the housing 126 of the end unit 10 by inserting the projecting legs into receivable sleeves 134, which are formed within the housing body 126.

In some embodiments, the CCD camera 120 and 121, which views an area of interest through transparent window 110, may be adjustable in one degree of freedom by tilting the adjustable holder 118, which is in turn supported on two supports 134, 136 that extend from the dome unit 112. In some embodiments, cameras 120 and 121 may each be supported on for example a separate post ending in for example a ball and socket joint or other suitable attachment device that may for example allow camera 120 to be swiveled or tilted into position upon installation.

Three led lamps 122, 123 and 124 may be utilized as visual indicators; led lamp 122 to indicate voltage within the end unit 10, and led lamps 123 and 124 to provide a visual indication that the cameras 121 and 120, respectively are operating as counters. Such lamps 122-124 may be visible through the transparent window 110. Within the external housing 126, the processor card 128 and the connectors card 130 may be encased. The housing body 126 is connected with screws, or with any other suitable connectors, to the external cover 132.

Figure 5:
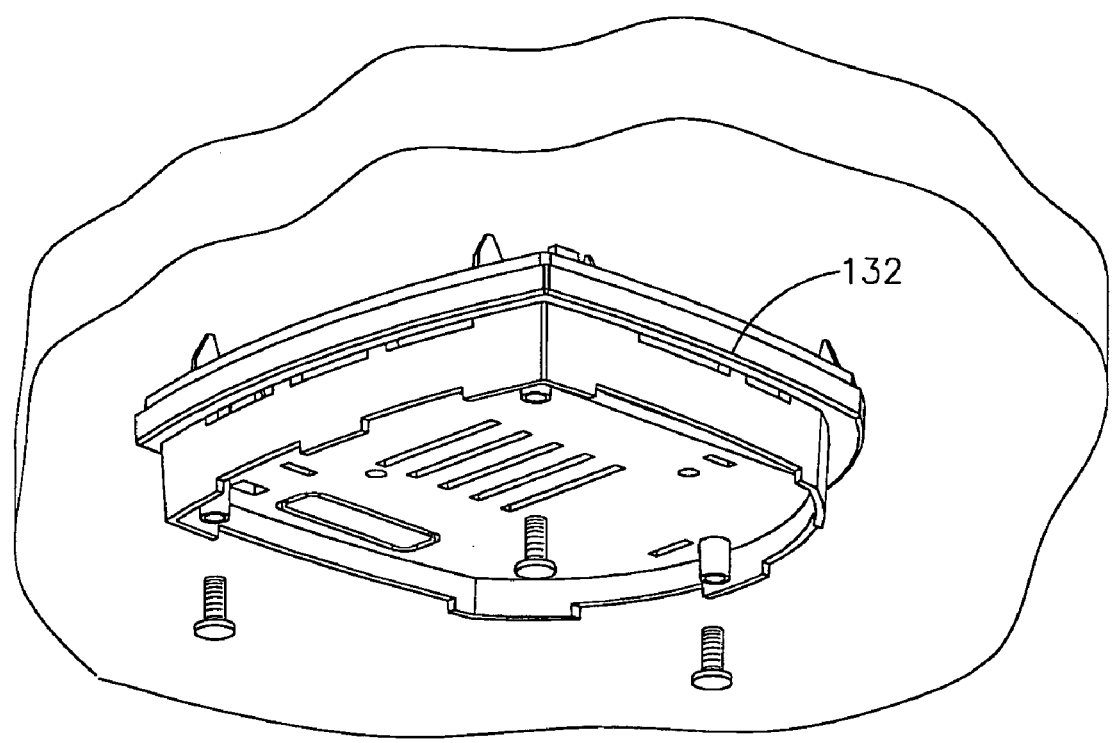
FIG. 5 illustrates the assembly of the end unit of FIG. 1 within a ceiling.
Figure 5:
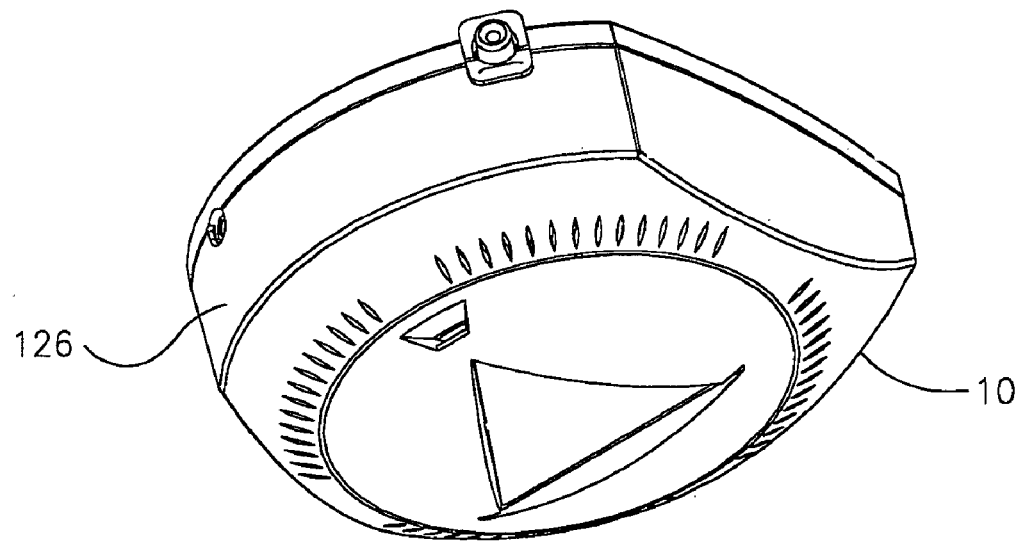

Reference is now made to FIG. 5, which illustrates the assembly of the unit 10, within in a ceiling. The housing cover is fixed to the ceiling using screws, and the external housing body is connected to it.

Figure 6A:
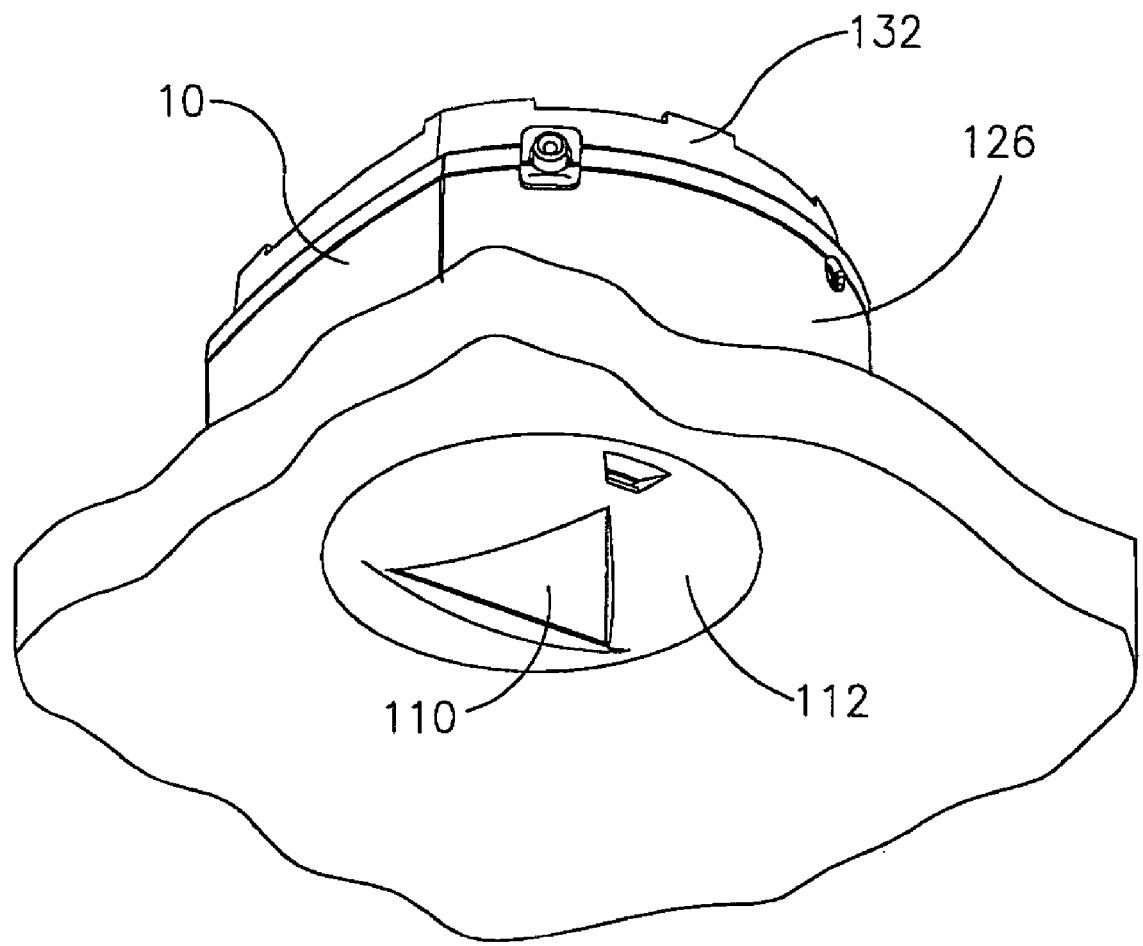
FIG. 6A is a view of the assembled end unit of FIG. 1.
Figure 6B:
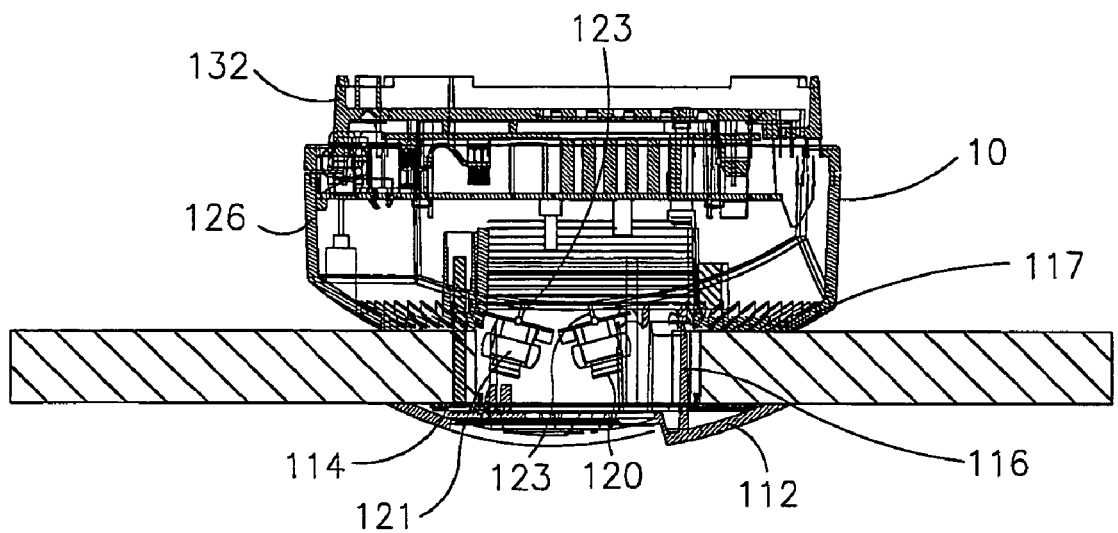
FIG. 6B and FIG. 6C are a sectional view and a general elevational view, respectively, of the end unit of FIG. 1 in its "open" mode for assembly in an acoustic ceiling.
Figure 6C:
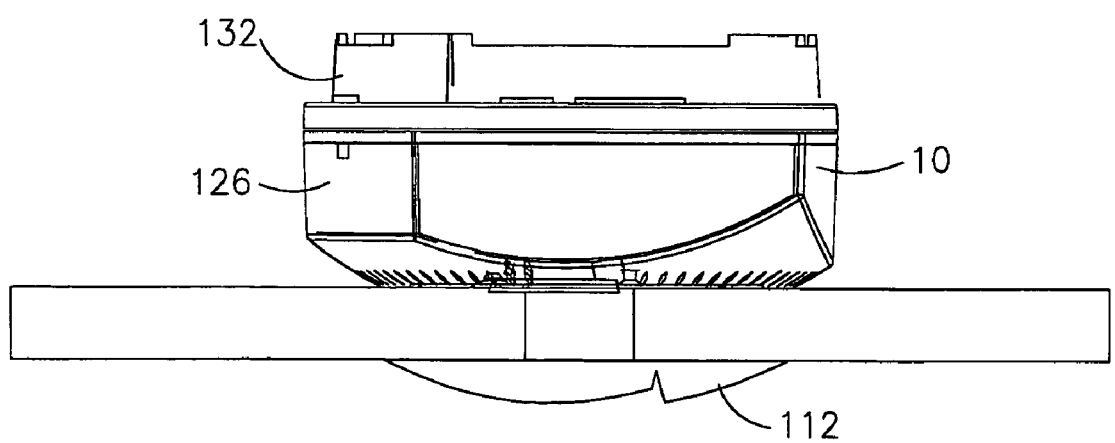

Reference is now made to FIGS. 6A-6C, which illustrate the assembly of the unit 10, within an acoustic ceiling. FIG. 6A is a view of the assembled unit, while FIG. 6B and FIG. 6C are sectional views and general elevational view of the end unit 10 in it's "open" mode (as required for assembling the unit in an acoustic ceiling).

The dome unit 112 with the camera 120 and 121 may be installed, as mentioned above or in another suitable manner that may allow the direction of each such camera 120 and 121 to be set independently by for example an installation technician, over the holding ring 114 and equipped projecting legs 116. Lips 117, which are used as snap connectors, are fixed to the ends of the legs. When the lips 117 are released (with the aid of a screwdriver, for example) from their position within sleeves 134 (which are formed in the external housing unit 126), the dome 112 with the cameras 120 and 121 within it may be pulled out from the closed position within the external housing unit 126. After disconnecting the wiring from the cameras 120 and 121 the end unit 10 may be dismantled into separate components.

As will be explained hereinafter, it is possible to install the end unit 10, without the additional fixtures, on the gypsum (plaster) surface of the acoustic ceiling. Normally, a gypsum/plaster board cannot carry a suspended weight, unless special anchors are fitted.

The external housing body 126, containing the processing and connector cards 128, 130 and the cover 132, are placed on the upper side of the ceiling surface. The ceiling surface is drilled in advance within to accommodate the projecting legs 116 of the dome 112. After re-wiring the cameras 120 and 121 and adjusting them with the adjustable holder 123, the projecting legs 116 of the holding ring 114 are threaded through the drilled surface and into the sleeves 134, which are formed in the external housing 126.

The dome unit 112 is then pushed towards the ceiling and attached to the interior surface of the ceiling. The lips 117 are snapped into pre-formed openings of external housing 126 allowing the dome unit 112 to be connected to the external housing body 126, so that the gypsum surface of the acoustic ceiling is situated between them. Thus, the major part of the end unit 10 is supported by the acoustic ceiling without being suspended therefrom thereby reducing the stress on the ceiling.

Figure 7:
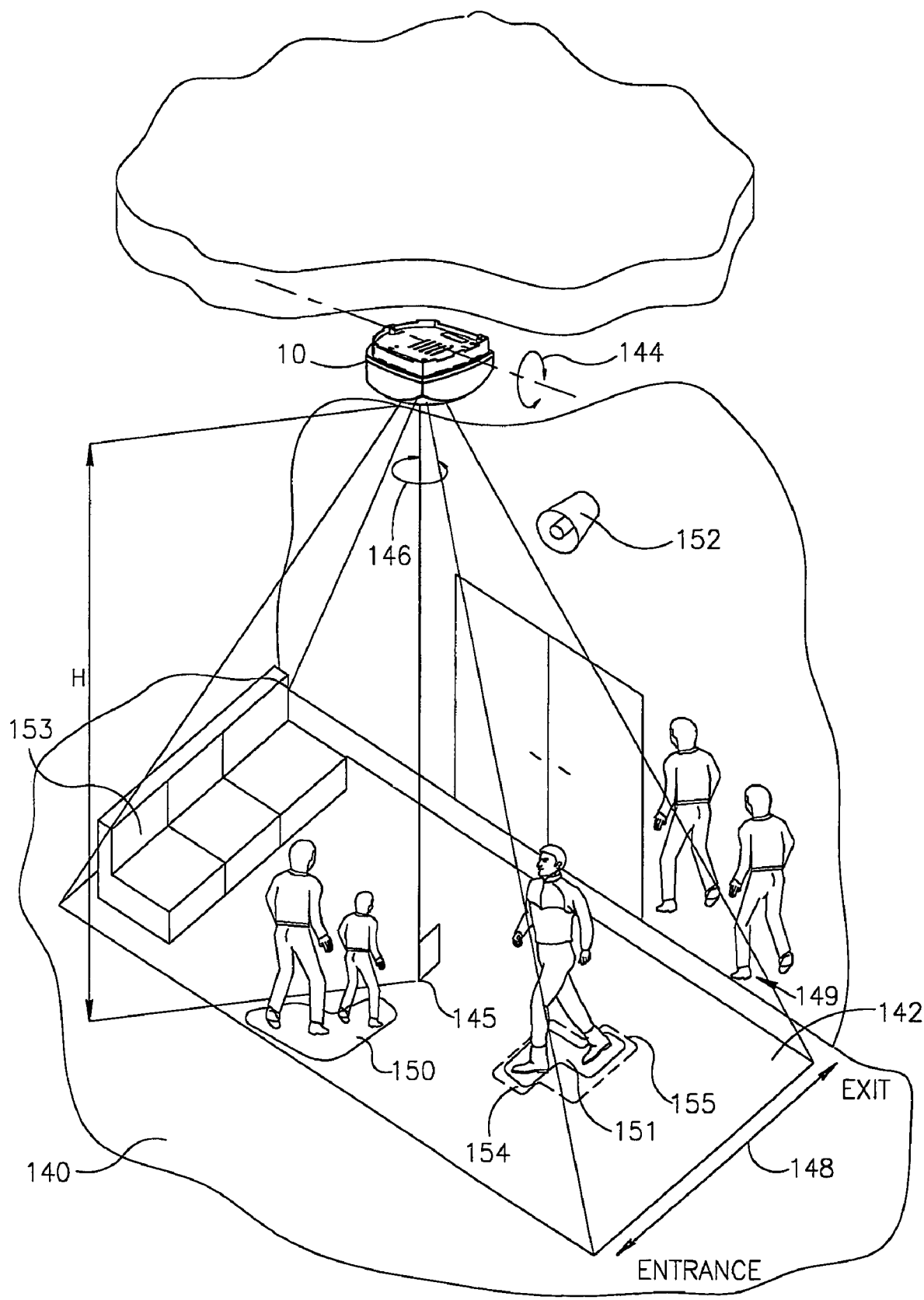
FIG. 7 illustrates the installation of the end unit above a given area of interest.

Reference is now made to FIG. 7, which illustrates the installation of the end unit 10 in accordance with the principle characteristics and parameters of the system.

The end unit 10 is installed above a given area of interest 140. The example described in FIG. 7 shows an entrance area (or an exit) located within a store. The control area is generally rectangle shaped, according to the field of view 142 (FOV) of the CCD camera 120. Preferably, the FOV of the camera 120 should correspond with the same plane as the given area 140.

The example in FIG. 7, shows an end unit 10 which is adjustable in two degrees of freedom (arrows 144, 146), with the help of the adjustable holder 123 and the rotating of dome unit 112 as described hereinabove with respect to FIGS. 4A-4C.

Therefore, in some embodiments, each of cameras 120 and 121 within end unit 10 may be locked in its own precise position—for example, one camera 120 being parallel to the floor surface 140, and another camera 121 being perpendicular to floor surface 140 and facing for example outside of a store towards a passerby route 113. The cameras 120 and 121 may be fixed so that the predicted direction of flow of people (arrow 148 or 149) over the area 140 will generally in parallel with one of the side of the rectangular FOV 142 (and not at a diagonal).

In some embodiments, the FOV of camera 120 may be positioned above and at a right angle to the area's center 145. This location may minimize the concealment of one person by another in the given area. An assumption is that the lighting conditions in the area provide sufficient light so that that the area 140 will be lit irrespective of the time of day or the weather conditions. As shown in FIG. 7, a lamp 152 ensures proper lighting conditions.

Another assumption in the present invention is that the background is static (without people moving over it), when it is exposed to the camera and has a stable color irregardless of the time of day. In contrast with a static background, a human body, while moving, creates dynamic and multi-spectrum color changes on the background. These changes are caught by the camera 120. The drastic color changes appear at least in the area wherein a moving figure has entered 154, and similarly a FIG. 155 which has left the area. Also, the human body does not have a homogenous shape, and therefore, when it moves, the camera records color changes of the human mass, as seen in movement by the camera's eye.

Figure 8:
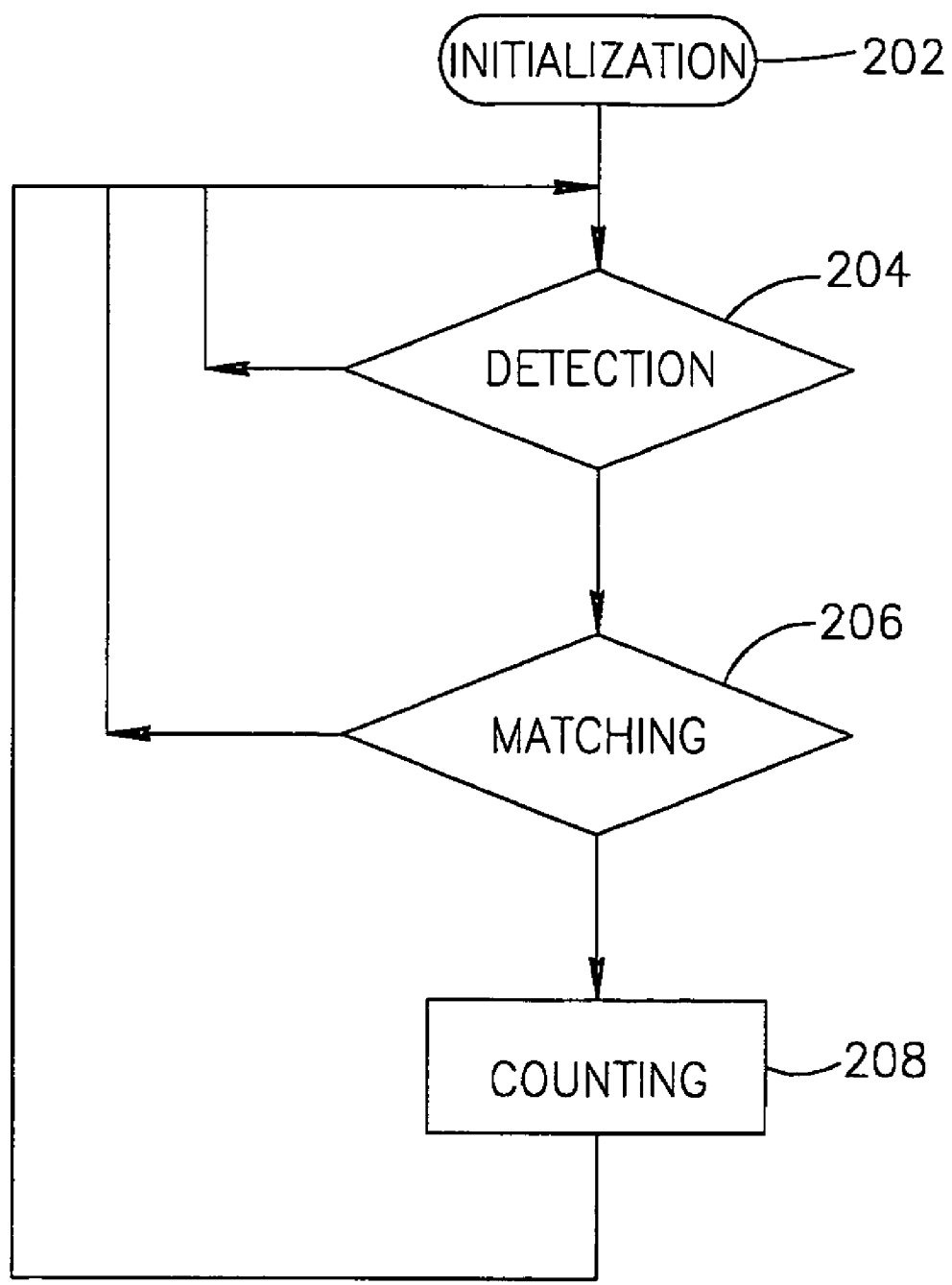
FIG. 8 is a flow chart which describes steps preformed to identify the objects as people, counting them as such and labeling their direction.

Reference is now made to FIG. 8, which is a flow chart illustration describing the general method of identifying and counting people and their direction of movement.

In the initialization step 202, the end unit processor is configured with the relevant parameters and data associated with the end unit 10, for the specific areas of interest within the FOV of the camera. After initialization, the end unit operates as part of a comprehensive system, as described hereinabove with respect to FIGS. 2 and 3.

As long as the unit is in operation, the CCD camera 120 and 121 may be activated to view an area of interest. It will therefore be appreciated by persons skilled in the art of video image processing that the description hereinafter, should be understood as part of a repetitive operation.

The detection step 204 aims to detect figures (persons) within the pre-selected areas of interest of the FOV of the camera. The detection step includes analyzing changes that occur in the areas of interest within the FOV based on at least two samples taken over a period of time. It will be appreciated by persons skilled in the art that this a known general principle in the filed of video image processing, but the application of this principle (by means of a specific algorithmic) is an unique feature of the invention is, as will be described hereinbelow.

The matching step 206 analyses the objects detected in the areas of interest within the FOV, while comparing the objects to the data accumulated in the program working memory of the end unit.

The matching step determines whether the object is a new figure that has entered the areas of interest (and may thus may potentially be counted as an "entrance" or "exit", see FIG. 7), or as an already known figure, that has remained within the areas of interest (and therefore should not be counted at this stage as an "entrance" or "exit"). In addition, the matching step verifies that a figure which was not detected in the present cycle, has indeed left the areas of interest (as an "entrance" or an "exit"), so the counting step 208 will count it.

The counting step 208 updates the counters stored within the non-volatile data memory of the end unit 10 (see FIG. 1). Each end unit 10 contains at least three counters for each camera 120 and 121 in the end unit 10; a first counter which counts the figures that have passed through the areas of interest within the FOV, and have left the areas in the direction the had been pre-labeled as for example an "entrance" (see FIG. 7); a second counter counts the figures that have passed through the areas of interest within the FOV and have left the areas in the direction that has been pre-labeled as an "exit" (see FIG. 7); and a third counter that counts figures that pass through the areas of interest within the FOV, and which are impossible to characterize as either an "entrance" or an "exit".

In addition, optionally, it is possible to maintain in the end unit memory, at least one additional counter for additional discrete information, which is not related to the image processing process of the camera (as described hereinabove with respect to FIG. 1)

In the initialization step 202, the scaling needed for processing is determined. Using the serial interface of the end unit (see FIG. 1), the technician programs the video processor 18 within the end unit with the data H of the camera height above the surface (see FIG. 7). In some embodiments, a different height may be programmed for each of the camera 120 in an end unit 10.

In accordance with the width of the camera sensor, the width of the FOV in pixel units, the focal length of the camera and the height data, the processor calculates the scaling according with the following known formula:

$$P_{scale} = \frac{H \times W_{ccd}}{W_{pixel} \times F_{ccd}} \qquad \text{[Equation 1]}$$

where: H=Height; $W_{ccd}$=width of the camera sensor; $W_{pixel}$=width of the FOV in pixel units; $F_{ccd}$=focal length of the camera.

For example, if the height "H"=4 meters, the width of the camera sensor=8.8 mm, the focal length=6 mm and the width of the FOV in pixel units=320 pixels, the scaling=1.8 cm per pixel.

Additionally, the initialization step may include the determination of the specific areas of interest within the FOV of the camera 120, in which data is to be collected. The areas of interest are determined as "windows" in regard to the places where movement of people is expected. For example, in FIG. 7, in which a store entrance/exit area 140 is shown, after the installation of the end unit 10 within the ceiling, the technician determines the areas of interest for video processing. The areas of interest do not include, for example, the FOV that contains the furnishing item (sofa 153), because, the movement of people is not expected there. Therefore, this FOV is not included in the programmed areas of interest "window".

For clarity, the invention is described with respect to a single area of interest only, but it will be appreciated that several areas of interest can also be initialized within the same FOV of the camera 120 of a single end unit 10.

The processor program is configured to ensure that, taking into account the scaling parameter (calculated by the video processor), a too small area of interest will be rejected.

The method according to the invention, assumes that a person passing through the area of interest will be identified as such at least twice while passing through the area of interest. The following equation calculates the number of observations of the figure passing through the area of interest:

$$NL = \frac{(W_{x_{max}} - W_{x_{min}}) \times P_{scale}}{V \times T_{cycle}} \quad \text{[Equation 2]}$$

where: wxmax and wxmin are the external coordinates of the viewing window in the direction of movement; pscale=scaling parameter (#pixels/cm); v=average velocity of a person moving through the area; and tcycle=time of the cycle.

As mentioned, the initialization step 202 includes the input of the network ID data of the unit (described hereinabove with respect to FIG. 1), if connected as part of a network of end units, and determining the direction (as an "entrance" or "exit" to the interest area—see FIG. 7).

It will be appreciated by persons skilled in the art that the initialization step can be carried out remotely, entirely or partly, relying on the installation height data, and the possibility of a receiving a visual video view to a remote location (described as an option hereinabove with respect to FIG. 1).

After the initialization step 202, the end unit starts operating in a cycle fashion, of detection 204 and matching 206 (with a count update 208, if necessary), wherein at any time, it is possible to remotely access the non-volatile data memory 22 (FIG. 1) and extract data from it.

Reference is now made to FIG. 9, which is a flow chart illustration of the basic detection steps, in order to detect the objects and identify them as potential figures. The receiving step 220 receives the digital video images (converted from the analog frame image into digital data) and stores the data in the program working memory 24 (FIG. 1).

Therefore, in time T1, an array of binary data containing the grayness level existing over a given area, is received, and this data is stored in the program working memory 24. In time T2 (following T1), a second array of binary data, containing grayness levels existing over the same given area, is received. Then the differences between the two arrays is calculated (step 222) at the single pixel level, for the pre-determined areas of interest only. The processor extracts from the program working memory the binary array for time T1, and subtracts it from the array received in time T2 with respect to the same interest area. The resulting calculation is an array, which reflects the color differences that have occurred. The change refer to the areas of interest only, at a single pixel resolution level, and for the time lapsed (T2–T1).

For clarity, the invention is described with reference to extracting data about the areas of interest that have been initialized in a single end unit 10, but the processing and memory capabilities of the end unit 10, according to the invention, enable the storage and processing of digital information that has been received from two cameras (described hereinabove with respect to FIG. 1).

Thus, it is also possible to load the processor and memory of a single end unit 10 with digital information, received from a camera of another end unit (see FIGS. 1 and 2 which describes this aspect of the invention).

In the threshold step (query box 224), the difference array is subjected to a preliminary filtering, in which the difference in color, are compared at a resolution level of a single pixel, to a pre-determined threshold level.

If the differences at a single pixel level are less than the threshold, they are rejected, as not representing a sufficient change in color to indicate a change occurrence requiring further processing. As mentioned above, the movement of a human body creates a dynamic change that involves drastic color changes (concealing and exposing the background color).

A bitmap of the areas of interest at the single pixel level is created (226)—a binary array of "1's" indicating a substantial change of color at the single pixel level, and "0's" if a change has not occurred or is less than the threshold level.

Reference is now also made to FIGS. 9A-9G, which are illustrative examples to clarify the detection step.

Figure 9A:
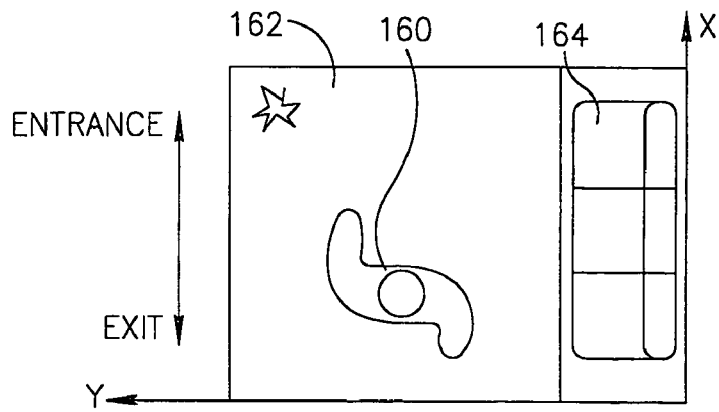

FIG. 9A shows an illustration of the field of view (FOV) of the end unit camera with the image of a man 160 walking in the expected direction of motion, towards the "entrance", with the region of interest 162 not containing the area where the sofa 164 is located.

Figure 9B:
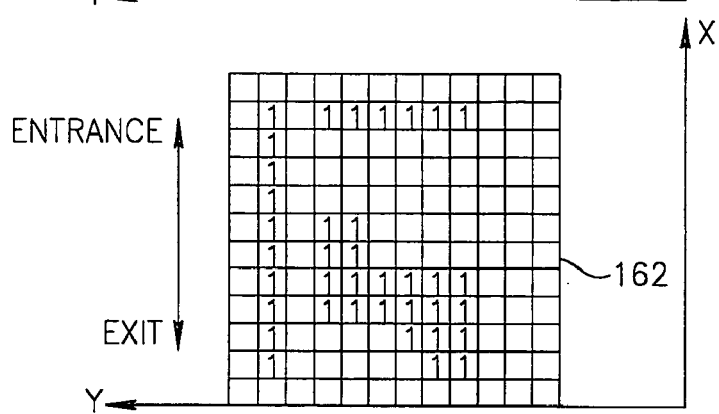

FIG. 9B shows an illustration of the bitmap of the area of interest 162 (FIG. 9A), the "1's" representing substantial changes of color at the single pixel level.

Referring again to FIG. 9, a "Y" histogram (step 228) is produced which consists of processing the bitmap 226 to locate coordinates of concentrations of changes in the direction perpendicular to the direction of expected motion.

The processing is performed using a histogram with the resolution of a single pixel, of the columns of the bitmap that are in the direction of the expected motion, then division by the zero points of the histogram, which are the columns in the direction of the expected motion in which no changes occurred, smoothing of the histogram using a filter and then its differentiation to find local minima points. In other words, summation of the number of change occurrences in the columns that are perpendicular to the y axis, calibration of the histogram according to any change in a column, smoothing of the graph obtained using a simple filter of the form Ax+B, and differentiation to find the local minima of the graph along the y axis.

Figure 9C:
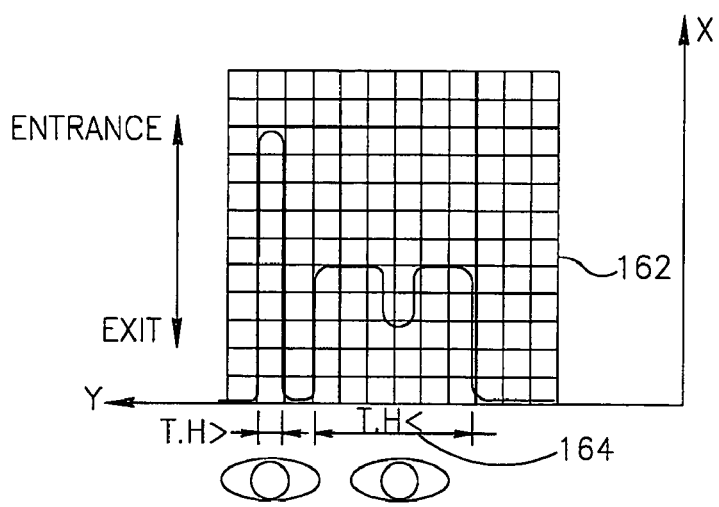

FIG. 9C illustrates the "Y" histogram that was generated from the bitmap in FIG. 9B.

It can be easily understood that between the minima of the histogram there is a concentration of changes that could represent the presence of a human figure in motion.

Referring again to FIG. 9, the "Y" histogram (228) is subjected to filtering, ("shoulder width" stage 230) which consists of filtering those coordinates where the space between them is too narrow to contain a human figure.

The filtering is performed according to the definition of a man's width (with a sufficient safety margin of around 80% of the shoulder width of an average man) and as a function of the scaling that was calculated previously. If the distance between two minimum points of the histogram, represents a distance that is smaller than the defined width of a man (taking the specific scaling into consideration) then it is clear that in the "slice" of the region of interest defined by these two adjacent minimum points there is no human figure in motion.

Referring to FIG. 9C, the "shoulder width" threshold stage will annul the necessity to continue examining the changes that were accumulated locally (for example—because of noise or motion not connected to the passage of a person).

For clarity, in the region of interest 162 illustrated in FIG. 9C, for which the filtering was performed, there is only one "slice" 164 remaining in which a moving man may be present. It is clear that after the filter operation there may be a number of such "slices".

Referring again to FIG. 9, the "shoulder width" slices (from step 230) are now checked to determine whether a "slice" is actually two or more people moving in the expected direction of motion with their shoulders' touching. If the width of the "slice" is a multiple of the "shoulder width" (allowing for safety margins) the "slice" is split.

An "X" histogram is created (step 234) by processing the bitmap to find overlapping coordinates—the coordinates of change concentrations in the direction of expected motion.

The coordinates on the "y" axis are known from step 232, which are perpendicular to the direction of expected motion, between which there may be one or more persons in motion, a matching "slice" must be found for each slice found in the previous stage. The overlaps that occur when the "slices" are matched are the areas in which it is possible to assume that there is a person in motion.

The "X" histogram (of changes in the direction of motion) is also calculated by summing the changes in the columns of pixels, except that these are not the columns that are perpendicular to the direction of expected motion, from one side of the region of interest to the other. The region of interest is divided into a grid of cells where the cell size in the direction of expected motion is equal to a single pixel size, while the cell size which is perpendicular to the direction of expected motion is much larger (for example—equivalent to 16 pixels).

Figure 9D:
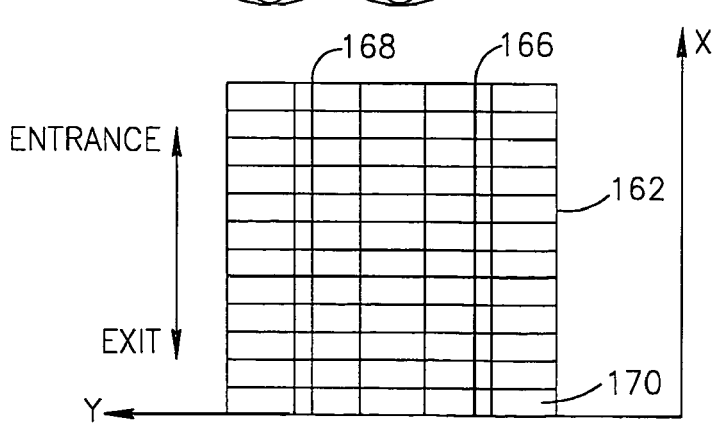

Reference is made to FIG. 9D which shows the previously calculated "y" coordinates 166, 168 and the grid of cells 170.

The summation of the changes in the direction of motion is performed for each line, cell by cell, where the cells that participate in the sum are those that are located inside a "slice" detected in the previous stage, or at least were crossed by.

In the case of cells that were located outside the borders of the "slice" or were not covered by it, there is no need to sum them as it has already been decided that there is no human motion in them.

It is reasonable to assume that the change histogram in the direction of motion will be much more homogenous as this is the direction of motion in which the change occurs—that is, human motion.

After this, the zero points of the change histogram in the direction of motion are found and the "slice" is divided by them into sections across its width (as shown in FIG. 9E).

Two additional filtering steps are now implemented; a "chest-back" threshold stage (step 236) and density threshold stage (step 238).

The "chest-back" threshold stage (236) is a first filter which is performed according to the defined human chest-back distance and as a function of the scaling previously calculated (with a sufficient safety factor—assuming we are looking for a section width of no less than 20% of the chest-back measurement of an average man). If the distance between two zero points of the "X" histogram, relates to a distance that is smaller than the defined chest-back distance (taking the specific scaling into consideration) then it is clear that the "slice" sector of the region of interest defined by the two close minima points does not contain a person in motion.

Referring now to FIG. 9E, for clarity, in the "slice" of the region of interest 162, on which the first filter is operated, there is only one remaining sector (referenced 172) in which a person in motion can be found. It is obvious that after the filter operation there may be a number of such sectors. Sector 174 of the histogram is indicative of "noise" and since it is less than the threshold cannot be a person.

The density threshold stage (238) is the second filter whose function is to prevent further processing of scattered noise. As shown in FIG. 9F, the area of the rectangular sector 176 in the overlapping "slices" of the change array which may represent a person in motion, is measured and then the percentage of change occurrences in it is calculated. The ratio of the number of changes per area is compared to a fixed threshold. If the ratio is below the threshold, the sector does not have a sufficiently high density change to represent a person in motion. In other words, if the rectangular sector 176 contained a low density of change indications, that do not represent a person in motion, then as a result of the basic assumptions described above in relation to FIG. 7, the density threshold stage would eliminate the rectangle 176 from further processing. For illustration purposes, a very low density rectangle is shown in FIG. 9F.

After filtering (steps 236, 238), a variance stage (step 240) attempts to reduce the rectangular sector's width in the "slice" of the change array, that may represent a human figure in motion, by processing the change data in the rows at the single pixel resolution level from both sides of the sector and comparing the results to a fixed threshold.

In this variance stage 240, an attempt is made to reduce, by as much as possible, the width of the rectangular sector in the "slice" of the change array by ignoring rows that are not "noisy" enough from the aspect of spatial frequency. The spatial frequency is calculated using the formula:

$$\frac{\sum_{i=0}^{n}(X_i - X_{i-1})^2}{n} \qquad \text{[Equation 3]}$$

Since these are the rows of the change data—no change in the direction perpendicular to the expected direction of motion of the person, it is reasonable to assume that exposure of the floor behind the back of an advancing man may indicate change (across the advancing back). It is clear that a homogenous row such as this does not belong to the advancing mass of a person.

Referring now to FIG. 9G, the non-"noisy" rows, referenced 178/180, will be eliminated from both ends.

The result of the variance calculation is then compared with a fixed threshold and a row that is not sufficiently "noisy" is "cut" from the rectangular sector. This operation is performed from both sides of the rectangular sector, as shown by arrows 182, 184. From the moment that from one of the sides the result of the calculation equals or exceeds the threshold, the row processing halts on that side and waits for the other side's processing to end. For the moment that both ends reach the threshold, then it is clear that there is a concentrated mass of change occurrences inside the rectangular sector.

The "chest-back" stage is then repeated (step 242), similar to step 236 according to the defined human chest-back distance as a function of the previously calculated scaling.

If the width of the rectangular sector in which the concentrated mass of change occurrences is located, relates to a distance that is smaller than the defined width of a person (taking the specific scaling into consideration) then it is clear that the sector of the "slice" of the region of interest does not contain a person in motion.

Then a check is made to determine whether a "slice" is actually two or more people moving in the expected direction of motion while touching one another (adjacent stage 244). If the width of the "slice" is a multiple of the "chest-back width" (with safety margins) the "slice" is split.

At the end of the detection stage (step 204—FIG. 8), a rectangular bitmap structures is obtained containing a detected region of change masses that are defined as being potentially human beings in motion (246).

Referring back to FIG. 1, the program and working memory 24 of the end unit 10 may in some embodiments contains two memories for each camera 120 and 121 in such end unit 10—a verified figure memory—that is change masses that were observed in the region of interest and obviously refer to human figures in motion, and a potential figure memory—that is change masses that were observed in the region of interest but have not been verified as human figures.

Now, with the two memories containing two counts—one of verified detections and one of potential detections, we will explain the matching stage 206 (FIG. 8).

The matching process (206) to the memory compares the detected potential figures in the present sampling cycle and detections from previous samples, in order to reduce the number of false detections.

FIG. 10 is a flow chart illustrating the basic steps of the matching stage (206) for matching potential figures detected in the regions of interest in the present detection cycle to figures detected there previously.

Referring to FIG. 10, a check is made to determine whether a changing mass was detected (step 250) in the region of interest that could represent a person in motion.

If no potential figure was detected in the present cycle, then the result of the non-detection is compared (step 252) with the verified detections stored in memory 24 of the end unit 10 (FIG. 1). If the memory is empty—that is the region of interest was and remains void of human motion, we return to the detection cycle (step 204).

On the other hand, if the comparison with the verified detection memory shows that for the first time, no figure was detected in the present cycle that relates to a verified figure in memory, then it is possible that the figure has left the region of interest (and then one must proceed to the counting stage (208—FIG. 8) or it has frozen in place and therefore no mass change was detected.

In order to check non-matching with the verified figure memory, a filter process (step 254) is implemented based on seniority that will be described later (from which it is possible to proceed to the counting process (208).

If a potential figure was detected in the present cycle, then the detection is examined in comparison with previous detections (step 256) in a process that will be detailed later.

If the present detection does not match previous detections, the potential detection memory is updated (step 258) and the detection is examined in relation with the verified detection memory by the filter process based on seniority (step 254).

If the potential detection matches a previous detection a check is performed as to whether this is the first time such a match was found (step 260).

If the potential figure that was detected matches the previous detection in memory, the detected figure will be tagged as a new verified figure, and the entire verified memory contents will checked for matches in the present cycle (step 262). If no match is found—the seniority filter process will be performed (step 254).

If the previous detections that match the potential figure had been previously verified—that is, they have a history of verifications, a check is performed (step 264) as to whether there is a crowded situation in the region of interest, where new figures continuously replace other figures. The check is performed by a density filter test that will be described later (from which it is also possible to proceed to the counting process 208, see FIG. 8).

In order to implement a matching criterion (step 260), coordinates of the detection center are calculated. The calculation is of the weighted center of the change structure and is performed using the formula:

$$\left(\frac{x*\sum y}{\sum x*y}\right), \left(\frac{y*\sum x}{\sum x*y}\right) \qquad \text{[Equation 4]}$$

The matching criterion consists of two accumulative tests—a maximum distance threshold for human motion, and among the possible matches, the match which is closest in color to the potential figure, as will be now explained.

The distance between the detection center and the centers of the known figures that were previously stored in the program working memory 24 of the unit, must not exceed the maximum distance that a man can be expected to move in one sampling period.

In accordance with the scaling of the specific end unit, the real time sampling frequency and the expected velocity of the man's motion as he passes through the region of interest (for example walking as opposed to running), a threshold is calculated—the maximum distance for which a match between detection centers and those stored in memory is sought.

Figure 10A:
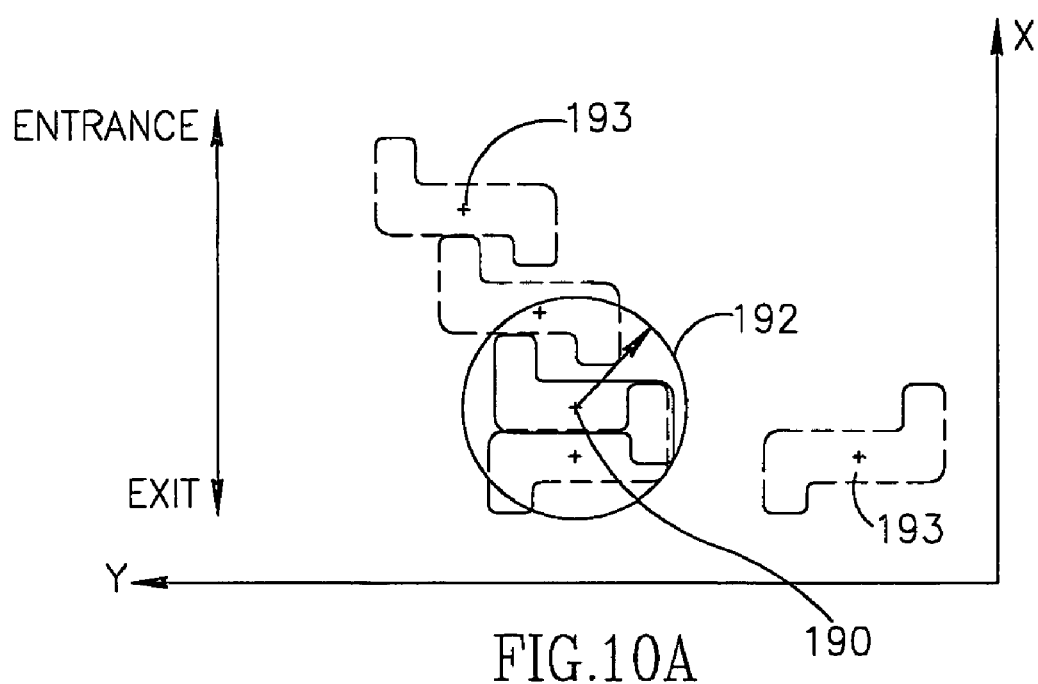
FIGS. 10a and 10b are schematic illustrations of the matching and clarification steps of the flow chart of FIG. 10.

Reference is now made to FIG. 10A which is a schematic illustration of the matching process. The present detection center 190 is checked as to whether it's distance matches the detection centers in memory. The radius r is calculated according to the maximum expected distance that a person can move since the previous sampling time. Therefore, centers inside the circle 192 can represent the location of the figure in the last sampling cycle, while centers 193 outside the circle are rejected as representatives of the location of the figure in the last sampling cycle.

Of all the possible matches, the one for which the Cartesian distance between the gray levels is minimum is sought. For this purpose the appropriate pixel image for the potential detection is retrieved from memory and compared with the pixel images that match the previously verified detections.

Figure 10B:
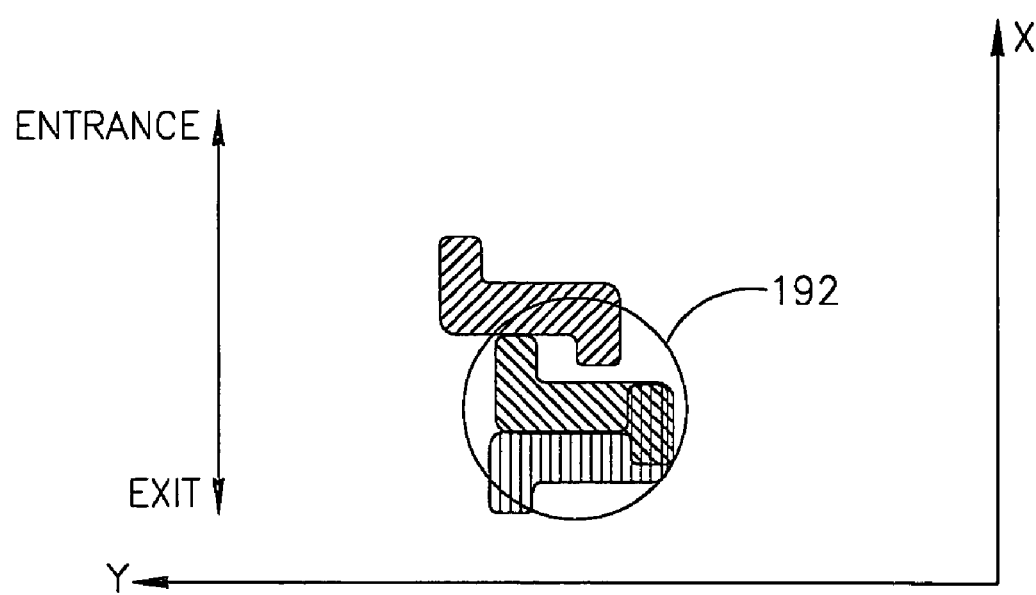

Reference is now made to FIG. 10B which is a schematic illustration of clarification of the matching stage. The present gray scale value is compared with the gray scale values of the previous detections in the circle 192 stored in memory.

When a match is found, the counter that counts the number of frames in which the figure was detected is incremented, in order to ensure that the figure is observed over a period of time and not as a momentary occurrence.

If the number of accumulated frames exceeds a threshold (frame limit), a new figure is generated in place of the existing one, and the details of the existing figure are passed to the counting module. This is in order to handle cases of congestion in the region of interest where one figure replaces another.

After a match is found, the figure's details are updated and its motion vector is calculated.

The present vector calculation is carried out using the difference between the figure centers, and normalizing it to the range of (−1,1). For each figure first and last vectors are calculated using a filter:

$$Vlast = Vlast*alpha + Vcurrent*(1-alpha)$$

$$Vfirst = Vfirst*(1-alpha) + Vcurrent*alpha$$

$$Vlast = (Vx, Vy), Vfirst = (Vx, Vy), alpha = 0.1 \text{ wherein}$$

In the case where a verified figure from the previous cycle was not detected again in the present sampling cycle, there are two possibilities: either the figure has left the region of interest and was therefore not detected (a person who has left the region of interest) or has become a static figure in the present sampling cycle and therefore did not provide an indication of change to the change array that would enable it to be detected (a person who "froze" in place in the region of interest).

In the second possibility (stopping in the region of interest) there may arise a problem when the figure starts moving again which may lead to it being recognized as a new figure that has suddenly appeared. In order to prevent such false detections, the matching process attempts to locate the figure for whom the indications of change have suddenly stopped by the "seniority" filtering process 254 (FIG. 10).

An attempt is made to locate the figure at the last rectangle coordinates at which it was last found. First, the rectangle is reduced by the spatial frequency method (described hereinabove with respect to FIG. 9—step 240).

If the remaining rectangle is greater than the minimum necessary, it is checked for overlap with verified detections, and overlapping rectangles are rejected. The Cartesian distance between the gray levels of the rectangle in the previous two cycles is calculated. If the distance is greater than a certain minimum value (the distance is required in order to reject background colors) and smaller than a maximum value, an assumed detection is defined and the counter is incremented.

The motion vector is set to (0,0) and the normal vector calculation is performed. The assumed detection process is performed until the counter reaches a certain threshold, in which case the figure is transferred to the counting module and is erased from the list of figures, or until the figure is actually detected, that is, starts to move again, in which case the counter is zeroed.

Once it is clear that the verified figure from the previous cycle was not re-detected in the present sampling cycle, but was caused by the figure leaving the region of interest, the counting stage is performed (208). In the counting stage, the non-volatile data memory 22 of the end unit is updated (FIG. 1) with remotely extractable data.

Figure 11:
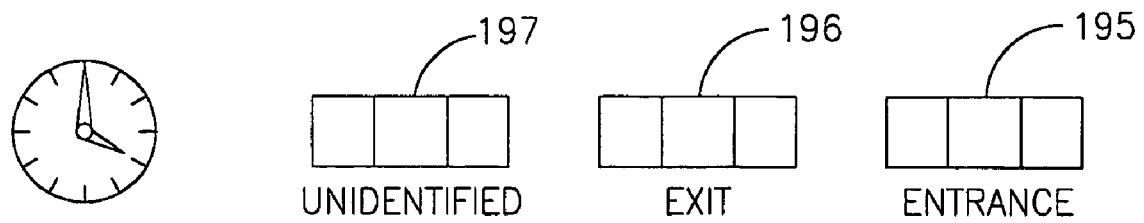
FIG. 11 is Fig a schematic illustration of the counting stage of the flow chart of FIG. 9.
Figure 11:
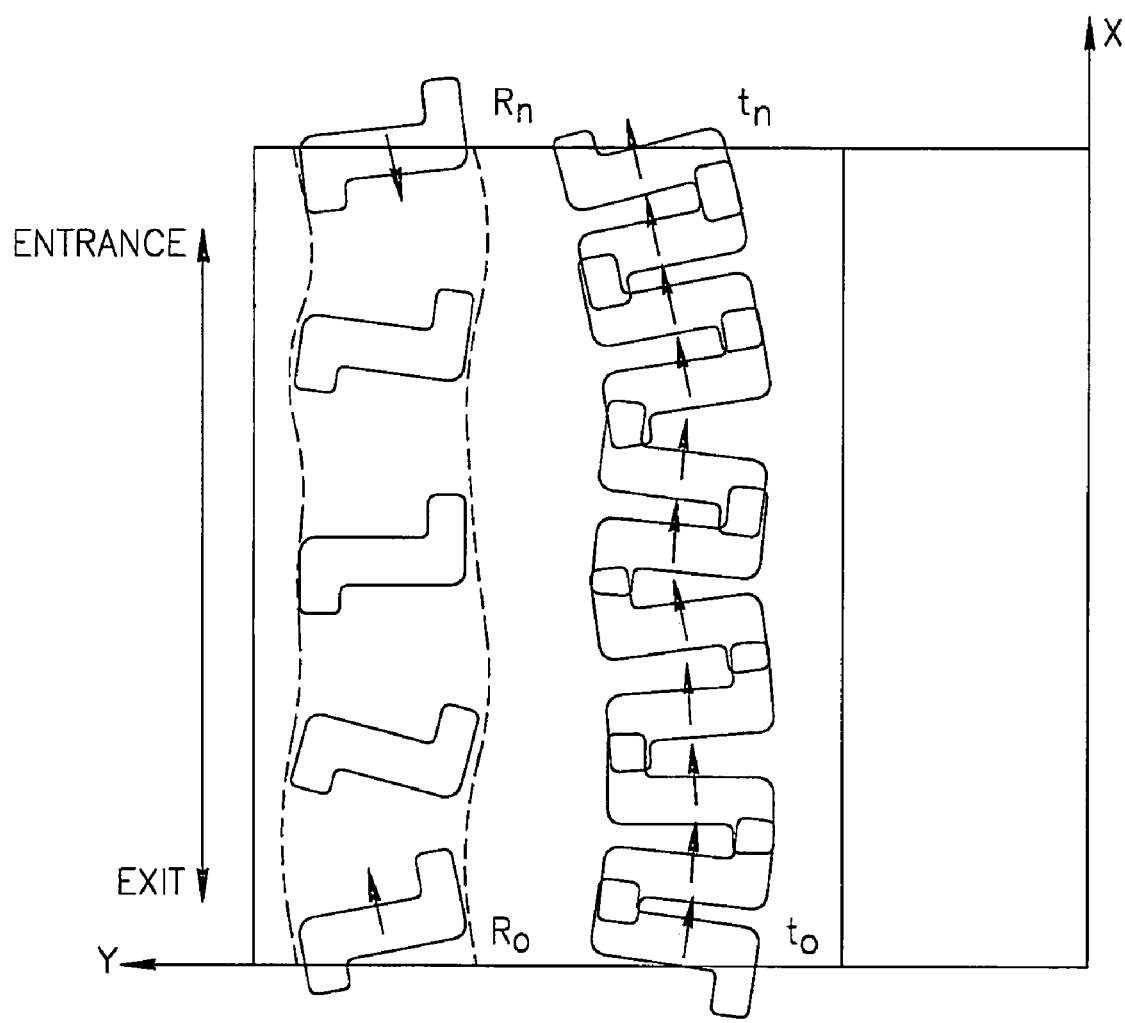

Reference is now made to FIG. 11 which is a schematic illustration of the counting stage 208. The end unit 10 contains three counters for each camera 120—an entry counter 195, an exit counter 196 and a "no direction" counter 197—for figures that pass through the region of interest in a direction that cannot be defined.

The initial definition of the direction as an "entrance" or an "exit" is set by the technician during the installation of the end unit 10, described hereinabove.

The determination of the figure's direction is obtained by comparing the initial motion vector of the figure which was matched within the region of interest, with the last motion vector of the figure.

In the example illustrated in FIG. 11, the X axis direction of the verified detection at t0 has the same sign (+) as the verified detection at tn (+), so based on the arbitrary determination of what is an "entrance" and what is an "exit", the "entry" counter 195 is updated. A "no direction" detection relates to a sequence of verified detections for which the first (R0) and last (Rn) detections have opposite signed motion vectors in the axis x direction.

The invention has been described above without providing a detailed, description of those aspects of an image processing system, known in the art and without detailing the components and software routine that implement the algorithms described above.

The invention was described with reference to the figures only as examples and without any restrictions derived from the detail. It should be emphasized that that many modifications and variations of the above described configurations, can be implemented without deviating from the scope of this invention.

The invention claimed is:

1. A method of counting persons traversing areas being monitored comprising:

initialization of at least an end unit, said end unit having installed therein, at least a camera producing images of a first area being monitored and a second separate area being monitored, said end unit comprising at least a non-volatile memory unit and a working memory unit, the non-volatile memory unit comprising a plurality of counters;

digitizing said images and storing said digitized images in a nonvolatile memory unit and a working memory unit;

detecting objects being potential persons from said digitized images;

comparing the digitized images of objects detected in said first area being monitored with digitized images of said first area being monitored stored in the working memory unit to determine whether the detected object is a new figure that has entered said first area being monitored or whether the detected object is a known figure, that has remained within said first area being monitored and to determine that a figure which was not detected has left said first area being monitored; and incrementing at least a first of said plurality of counters with an indication of the number of persons that have passed through said first area being monitored, comparing the digitized images of objects detected in said second area being monitored with digitized images of said second area being monitored stored in the working memory unit to determine whether the detected object is a new figure that has entered said second area being monitored or whether the detected object is a known figure, that has remained within said second area being monitored and to determine that a figure which was not detected has left said second area being monitored; and incrementing at least a second of said plurality of counters with an indication of the number of persons that have passed through said second area being monitored, and comparing said indication of the number of persons that have passed through said first area being monitored with said indication of the number of persons that have passed through said second area being monitored.

2. The method according to claim 1, and further comprising the step of:
remotely retrieving data from said non-volatile memory unit and a working memory unit via a communications network.

3. The method according to claim 2, wherein said communications network is one of a group including a GSM cellular network and the Internet.

4. The method according to claim 1, and further comprising the step of:
processing data to produce a displayable report; encrypting said report; and
accessing said encrypted report from a remote site via a communications network, said encrypted report being accessible by authorized users.

5. The method according to claim 4, wherein said communications network is one of a group including a GSM cellular network and the Internet.

6. The method according to claim 1 wherein said step of initialization further comprises the step of inputting the network ID data of the end unit if said unit is connected as part of a network of end units.

7. The method according to claim 1, wherein said step of initialization further comprises the step of determining the direction of motion of persons being monitored in said first area being monitored.

8. The method according to claim 7, wherein said step of determining the direction of motion of the figures comprises the step of initializing the video processor with directional definitions for bi-directional motion through the monitored area and the height of the camera above the surface.

9. The method according to claim 1, wherein said step of incrementing comprises the step of incrementing said counter for each object identified as a person passing through said first area being monitored, said person being identified by assigning a direction of motion to an object determined to be a potential person and verifying the direction of the potential person over a period of time to determine the potential person as a person to be counted.

10. The method according to claim 1, wherein said step of digitizing comprises the steps of:
in a time T1, receiving a first array of binary data containing the grayness level existing over a first area being monitored and storing said first array in the program working memory;
in a time T2, receiving a second array of binary data containing grayness levels existing over said first area being monitored;
calculating the differences between the first and second arrays at the single pixel level to obtain an array representing color differences;
creating a bitmap at the single pixel level comprising a binary array indicating a substantial change of color at the single pixel level and changes that have not occurred or are less than a pre-determined threshold level;
processing the bitmap to prepare an "Y" histogram to locate coordinates of concentrations of changes in the direction perpendicular to the direction of expected motion and an "X" histogram to find overlapping coordinates of change concentrations in the direction of expected motion; and
analyzing said "Y" and "X" histogram at the single pixel level.

11. The method according to claim 10, wherein said step of detection further comprises the step of filtering said histogram by rejecting those coordinates where the space between them is too narrow to contain a human figure as determined by pre-determined thresholds.

12. The method according to claim 11, wherein said pre-determined thresholds representing the width of a man's shoulders and the distance between his chest and back in the direction of the expected bi-directional motion.

13. The method according to claim 11, wherein said step of detection further comprises the step of further filtering said histogram by rejecting objects not having a sufficiently high density change representing a person in motion.

14. The method according to claim 1, wherein said step of detection further comprises the step of applying a spatial frequency threshold.

15. The method according to claim 14, wherein said spatial frequency threshold is performed alternately from both sides of the potential figure.

16. The method according to claim 1, further comprising the steps of:
identifying a person as a moving figure by comparing the potential person with previously verified figures stored in memory and comparing the potential person with previously detected but non-verified figures stored in memory.

17. The method according to claim 16, further comprising the steps of:
comparing the potential person with previously detected figures stored in memory; and
searching for previously detected figures that were not detected during the present detection period.

18. The method according to claim 1, further comprising the step of determining that a person has a first area to be monitored if said person was not detected during a plurality of detection periods.

19. The method according to claim 1, wherein said initialization of at least one end unit comprises initializing said at least one unit including at least two cameras installed therein, a first of said cameras producing images of said first area being monitored and a second of said cameras producing images of said second area being monitored.

20. An end unit for use with a video based image processing system, the end unit configured to obtain information about the motion of people in at least a first area and a second other area, the end unit comprising:
at least a CCD camera for capturing images of said first area and said second other area;
an A/D converter for converting analog information from said camera to digital information;
a digital switching unit connected to the A/D converter;
a video processor connected to the digital switching unit, for receiving the digital video information from said digital switching unit and to process said digital information at a single pixel level; and
a non-volatile memory unit and a program working memory unit.

21. The end unit according to claim 20, and further comprising:
at least one digital video data input connected to the digital switching unit for receiving data from a second CCD camera.

22. The end unit according to claim 20, wherein said non-volatile memory unit is remotely accessible and stores data on the number of people in said first area and said second area.

23. The end unit according to claim 20, wherein said non-volatile memory unit includes discrete data input stored therein.

24. The end unit according to claim 20, and further configured for installation in an acoustic ceiling, having the body of the end unit above the ceiling and the CCD camera below the ceiling.

25. The end unit according to claim 24, wherein said camera is fitted within a dome unit connectable to said body by snap connectors fitted to extendable flanges.

26. A system for counting persons traversing a first area and a second other area comprising:
at least an end unit configured to obtain information about the motion of the people in at least a first area and a second other area, said end unit comprising:
at least a CCD camera for capturing images of said first area and said second other area;
an A/D converter for converting analog information from the camera to digital information;
a digital switching unit connected to the A/D converter;
a video processor connected to the digital switching unit, for receiving the digital video information from said digital switching unit and to process said digital information at a single pixel level; and
a non-volatile memory unit and a program working memory unit.

27. The system as in claim 26, comprising
a device for remote retrieval of data stored in said non-volatile memory unit;
a processor for processing said data and generating reports comparing a number of persons traversing said first area with a number of persons traversing said second area; and
a device for displaying said reports.

28. The system according to claim 26 wherein said report is encrypted and wherein said encrypted report is accessible from a remote site via a communications network by authorized users.

29. The system according to claim 28, wherein said communications network is one of a group including a GSM cellular network and the Internet.

* * * * *